United States Patent
Nishimura

(10) Patent No.: US 7,269,678 B2
(45) Date of Patent: Sep. 11, 2007

(54) INTERRUPT REQUEST PROGRAM AND MICROCOMPUTER

(75) Inventor: Tadaharu Nishimura, Obu (JP)

(73) Assignee: DENSO Corporation, Kariya (JP)

( * ) Notice: Subject to any disclaimer, the term of this patent is extended or adjusted under 35 U.S.C. 154(b) by 258 days.

(21) Appl. No.: 11/089,309

(22) Filed: Mar. 25, 2005

(65) Prior Publication Data

US 2005/0216635 A1  Sep. 29, 2005

(30) Foreign Application Priority Data

Mar. 26, 2004  (JP)  ............................. 2004-092067

(51) Int. Cl.
*G06F 9/46* (2006.01)
*G06F 13/00* (2006.01)

(52) U.S. Cl. ...................... 710/260; 712/244; 718/100; 718/107

(58) Field of Classification Search ........ 710/260–262, 710/264–266
See application file for complete search history.

(56) References Cited

U.S. PATENT DOCUMENTS

| | | | | | |
|---|---|---|---|---|---|
| 4,001,783 | A | * | 1/1977 | Monahan et al. | 710/264 |
| 5,758,169 | A | * | 5/1998 | Nizar et al. | 710/266 |
| 6,298,410 | B1 | * | 10/2001 | Jayakumar et al. | 710/266 |
| 6,820,155 | B1 | * | 11/2004 | Ito | 710/262 |
| 6,983,339 | B1 | * | 1/2006 | Rabe et al. | 710/260 |
| 2001/0052043 | A1 | * | 12/2001 | Pawlowski et al. | 710/260 |

FOREIGN PATENT DOCUMENTS

| | | |
|---|---|---|
| JP | A-5-88916 | 4/1993 |
| JP | A-6-202887 | 7/1994 |
| JP | A-2004-234643 | 7/1994 |
| JP | A-6-309179 | 11/1994 |

* cited by examiner

*Primary Examiner*—Glenn A. Auve
(74) *Attorney, Agent, or Firm*—Nixon & Vanderhye P.C.

(57) ABSTRACT

An interrupt controller specifies and outputs the most highly prioritized one of a plurality of interrupt signal requested for output. A CPU executes a process corresponding to an interrupt signal from the interrupt controller and executes OS-provided programs. Based on reception of a request to execute a task level process, the CPU requests the interrupt controller to output an interrupt signal corresponding to the task level process.

23 Claims, 9 Drawing Sheets

INTERRUPT REQUEST PROGRAM AND MICROCOMPUTER

CROSS REFERENCE TO RELATED APPLICATIONS

This application is based on and incorporates herein by reference Japanese Patent Application No. 2004-92067 filed on Mar. 26, 2004.

FIELD OF THE INVENTION

The present invention relates to a program causing a multi-interrupt unit to compare task level process priorities in task scheduling and relates to a microcomputer to execute the program.

BACKGROUND OF THE INVENTION

Conventionally, there are known specifications about general RTOS' (real-time operating systems) such as OSEK-OS and ITRON operating on an instruction execution unit such as a CPU. The specifications prescribe an interrupt level process and a task level process as categories of processes executed on the operating system.

Specifically, the RTOS specification prescribes an interface to accept execution requests for task level processes. When a program developer creates an application program that calls a specified program as a task level process, the program developer programs the application program so as to call the specified program using that interface.

The CPU may execute a process by accepting an interrupt signal from an interrupt controller. The RTOS specification prescribes such process as an interrupt level process. When the CPU executes a specified interrupt instruction, the instruction may be performed in a manner similarly to the case where the CPU receives an interrupt signal. In this case, a process may be executed based on execution of the specified interrupt instruction. The RTOS specification also prescribes this process as the interrupt level process.

Whether or not a process executed on the RTOS is the task level process can be determined based on how the process is executed. Specifically, a process is determined to be the task level process when that process is executed by using an interface (hereafter referred to as a task activation interface) for accepting a request for task level process execution. A process is not determined to be the task level process when that process is executed by not using the interface for accepting a request for task level process execution.

It is considered that the conventional RTOS accepts a request to execute the task level process via the above-mentioned task activation interface. In this case, the CPU compares priorities assigned to the task level process whose execution request is accepted, a currently executing process, and a task level process whose execution request was accepted in the past and whose execution is not complete yet at the present. The CPU executes the process having the highest priority. In this manner, the RTOS compares priorities and determines a process to be executed based on a comparison result. This is called RTOS task scheduling.

When the process currently executing on the RTOS terminates, the CPU performs the following during the RTOS task scheduling. The CPU compares priorities of task level processes whose execution requests were accepted in the past and whose execution is not complete yet at the present. The CPU executes the process having the highest priority.

Generally, the interrupt level process is configured to be executed at a higher priority than for the task level process. While the task level process is executed on the RTOS, the CPU may receive an interrupt signal from the interrupt controller. In such case, the CPU interrupts the currently executing task level process and executes the interrupt level process corresponding to the received interrupt signal.

A conventional interrupt controller has the multi-interrupt function. The multi-interrupt function chooses from a plurality of interrupt signals requested for output and outputs the most highly prioritized interrupt signal. Specifically, the interrupt controller having the multi-interrupt function outputs an interrupt signal to the CPU. When the CPU executes a process corresponding to that interrupt signal, the CPU may receive an output request from another interrupt signal. At this time, the controller compares the priority of the interrupt signal requested for output with that of the previously output interrupt signal. Only when the priority of the interrupt signal requested for output is higher than that of the previously output interrupt signal, the controller outputs the requested interrupt process to the CPU.

While the CPU executes the above-mentioned task scheduling under the conventional RTOS, much of the CPU processing time is consumed for the task scheduling process itself. As a result, this limits the CPU time actually available for the task level process and the interrupt level process.

SUMMARY OF THE INVENTION

The present invention has been made in consideration of the foregoing. It is therefore an object of the present invention to use the multi-interrupt function to decrease the time consumed for task scheduling by a CPU which selectively performs a plurality of tasks.

To achieve the above-mentioned object, an interrupt request program according to the present invention causes an instruction execution unit to function as interrupt request means based on reception of a request to execute a task level process. In this case, the instruction execution unit executes a process corresponding to an interrupt signal from a multi-interrupt unit for specifying and outputting the most highly prioritized one of a plurality of interrupt signals requested for output. The interrupt request means requests the multi-interrupt unit to output an interrupt signal corresponding to the task level process.

Based on reception of a request to execute a task level process, the instruction execution unit executes the interrupt request program and requests the multi-interrupt unit to output an interrupt signal corresponding to the task level process. The multi-interrupt unit receives the requests, specifies the most highly prioritized one of the received requests, and outputs an interrupt signal corresponding to the specified request. The instruction execution unit executes a process corresponding to the interrupt signal received from the multi-interrupt unit. Therefore, the instruction execution unit causes the multi-interrupt unit to compare priorities of the task level processes. The use of the multi-interrupt function can decrease the time consumed for task scheduling by the instruction execution unit that changes over a plurality of tasks for execution.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
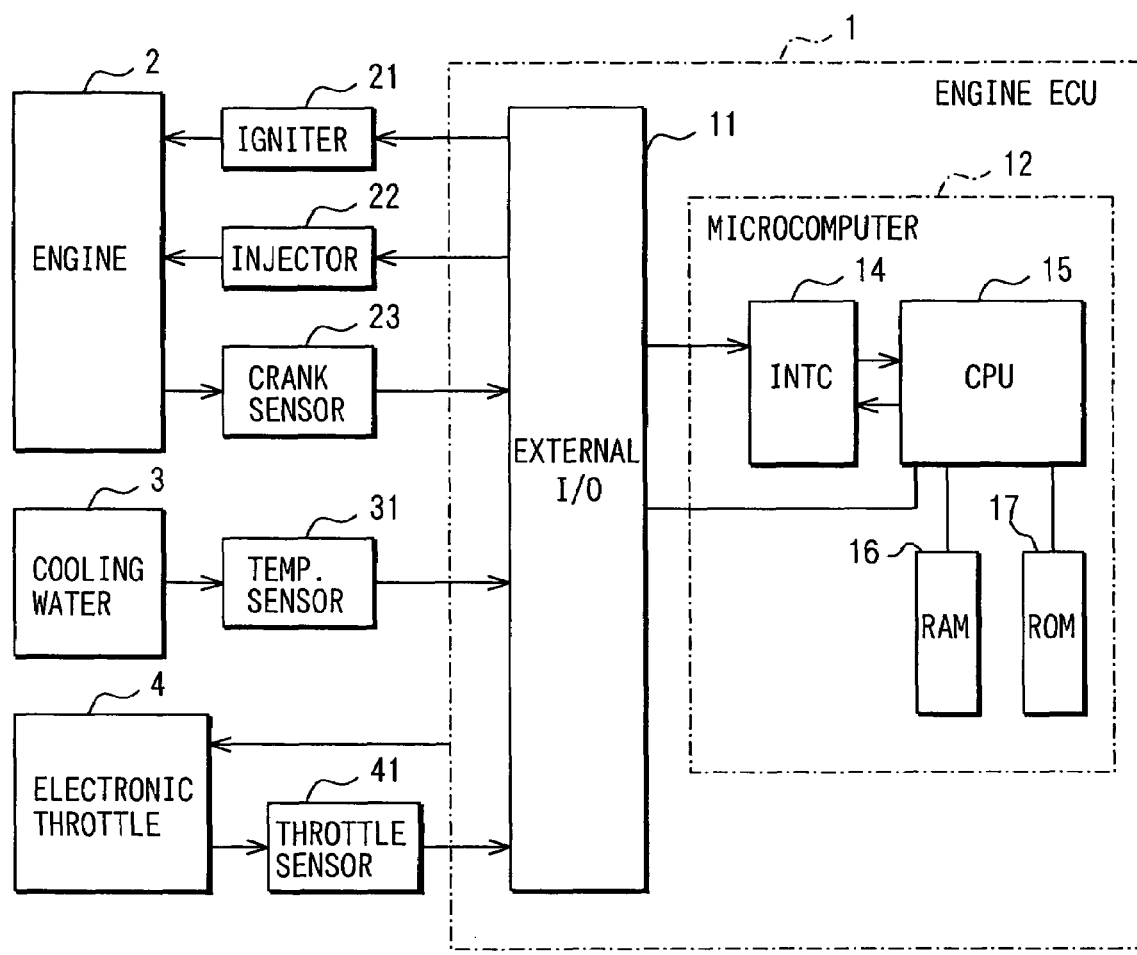
FIG. 1 shows the configuration of an engine ECU.

The following describes a first embodiment of the present invention. FIG. 1 shows the configuration of an engine ECU 1 according to the embodiment. The engine ECU 1 controls an engine 2. The engine ECU 1 is supplied with a pulse signal from a crank sensor 23. This signal notifies that a crank of the engine 2 has reached a specified crank angle. The engine ECU 1 is supplied with information about a temperature of engine cooling water 3 from a water temperature sensor 31. Further, the engine ECU 1 is supplied with information about a throttle angle from a throttle sensor 41. Based on the input information, the engine ECU 1 calculates ignition timing, an injection quantity, a throttle adjustment amount, and the like of the engine 2. Based on calculation results, the engine ECU 1 controls an igniter 21 to ignite fuel, an injector 22 to inject fuel, and an electronic throttle 4.

For these operations, the engine ECU 1 has an external input/output circuit 11 and a microcomputer 12. The microcomputer 12 has an interrupt controller 14, a CPU 15 as an instruction execution unit, and a RAM 16 and a ROM 17 as storage media.

The external input/output circuit 11 receives information from the water temperature sensor 31 and the throttle sensor 41 and outputs the received information to the CPU 15. Based on a pulse signal received from the crank sensor 23, the external input/output circuit 11 requests the interrupt controller 14 to output an interrupt signal. The external input/output circuit 11 receives control signals from the CPU 15 and outputs the signals to the igniter 21, the injector 22, and the electronic throttle 4.

The CPU 15 reads and executes various programs stored in the ROM 17. The CPU 15 receives signals from the water temperature sensor 31 and the throttle sensor 41. Based on these signals, the CPU 15 calculates ignition timing, an injection quantity, a throttle adjustment amount, and the like.

During the calculation, the CPU 15 reads and writes information to the RAM 16 as needed. Alternatively, the CPU 15 reads information from the ROM 17. Further, the CPU 15 receives an interrupt signal from the interrupt controller 14 and executes specified programs based on the received interrupt signal.

The CPU 15 executes a plurality of programs on a time-sharing basis. That is, the CPU 15 executes only one program at a time. Based on predetermined program priorities, the CPU 15 switches between programs to be executed as needed. Further, the CPU 15 executes OSEK-OS as a realtime operating system and executes various programs on the OSEK-OS.

Specifically, the CPU 15 switches between programs based on interrupt signals from the interrupt controller 14.

Figure 2:
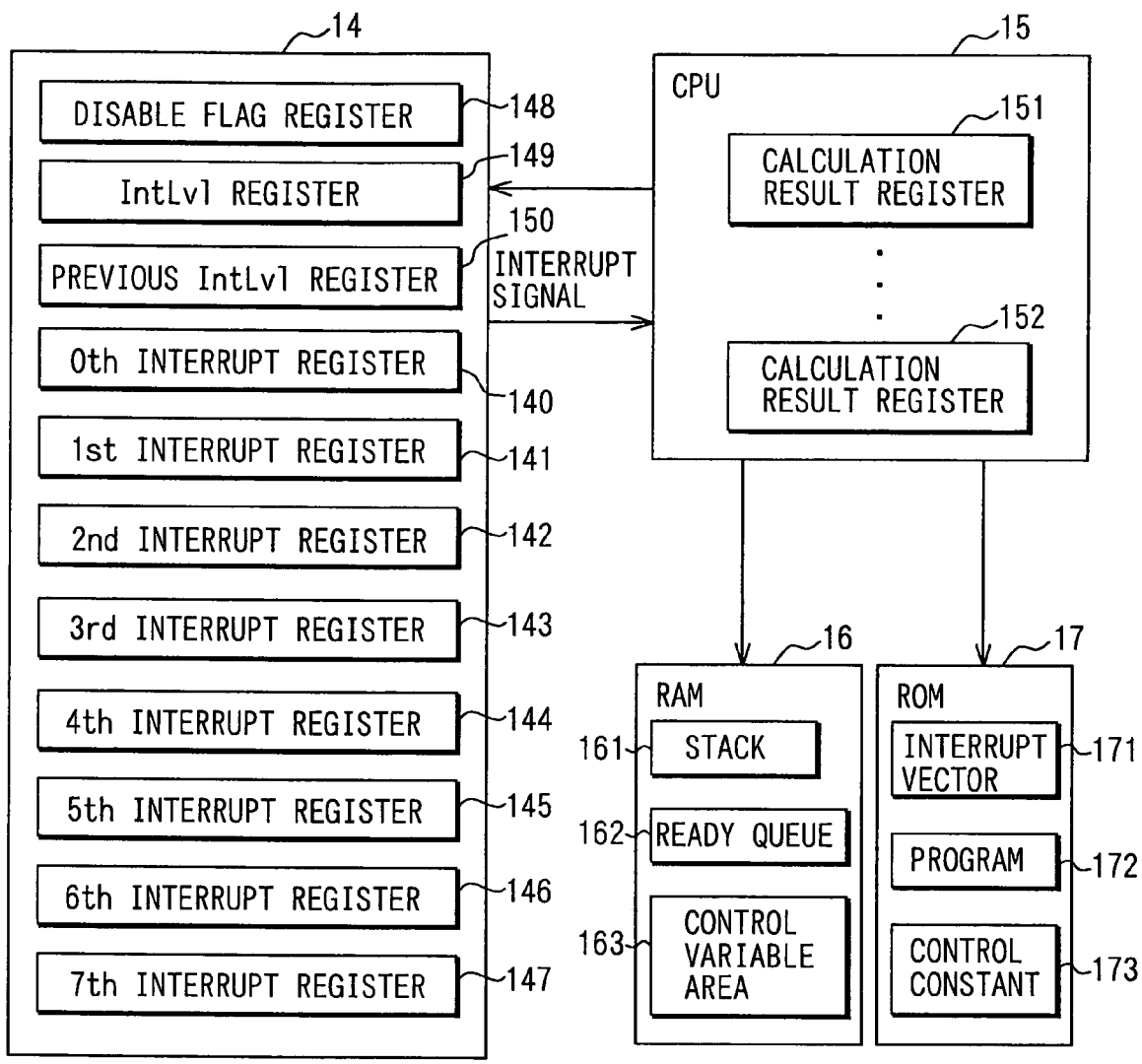
FIG. 2 shows data structures of storage media in an interrupt controller, a CPU, a RAM, and a ROM.

FIG. 2 shows data structures of storage media in an interrupt controller 14, a CPU 15, RAM 16, and ROM 17 so as to explain operations to switch between programs for the CPU 15.

The CPU 15 has a plurality of registers such as calculation result registers 151, 152, and the like to store calculation results.

The RAM 16 has storage areas such as a stack 161, a Ready queue 162, and a control variable area 163 to control the engine 2. The Ready queue 162 has five FIFO (first-in first-out) buffers, i.e., third through seventh interrupt registers 143 through 147 for the interrupt controller 14 to be described later.

The ROM 17 contains an interrupt vector 171, a plurality of programs 172 for execution in the CPU 15, and a control constant 173 to control the engine 2. The interrupt vector 171 provides correspondence information between an interrupt signal from the interrupt controller 14 and a program the CPU 15 starts executing based on the interrupt signal.

The interrupt controller 14 contains eight interrupt registers 140 through 147 (zeroth through seventh), a disable flag register 148, an IntLvl register 149, and a previous IntLvl register 150.

Figure 3:
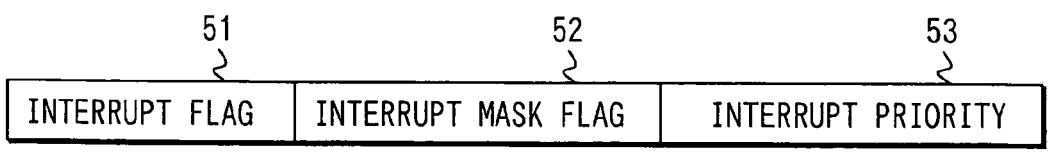
FIG. 3 shows a data storage format of zeroth to seventh interrupt registers.

The zeroth through seventh interrupt registers 140 through 147 use the same data storage format. FIG. 3 shows a data storage format of the zeroth to seventh interrupt registers 140 through 147. Each of the zeroth through seventh interrupt registers 140 through 147 stores data from the beginning of the data storage area in the order of an interrupt flag 51, an interrupt mask flag 52, and an interrupt priority 53.

The following describes operations of the interrupt controller 14. The interrupt controller 14 according to the embodiment is a known multi-interrupt controller or unit.

The interrupt controller 14 receives a request to output an interrupt signal specified with any of the zeroth through seventh interrupt registers 140 through 147. The interrupt controller 14 sets a value of the specified interrupt register's interrupt flag 51 to 1 (on). The interrupt controller 14 sets a value of the specified interrupt register's interrupt mask flag 52 to 0 (off). According to the embodiment, an interrupt signal from the CPU 15 is used for a task level process to be described later.

In addition, the interrupt controller 14 receives a request to output an interrupt signal specified with any of the zeroth through seventh interrupt registers 140 through 147 from the external input/output circuit 11. In this case, the interrupt controller 14 sets a value of the specified interrupt register's interrupt flag 51 to 1 (on).

In this manner, the interrupt controller 14 uses the storage medium to store that the CPU 15 or the external input/output circuit 11 requests outputting of specified interrupt signals.

When receiving the request to output an interrupt signal, the interrupt controller 14 then specifies an interrupt register corresponding to the currently requested interrupt signal out of the zeroth through seventh interrupt registers 140 through 147. That is, such interrupt register contains the interrupt flag 51 set to 1 and the interrupt mask flag 52 set to 0. The interrupt register corresponding to the currently requested interrupt signal can be an interrupt-enabled interrupt register. The interrupt controller 14 then specifies an interrupt register having the highest interrupt priority out of the specified interrupt registers.

The interrupt register's priority is determined by a value of the interrupt priority 53. The interrupt priority value is set to any of integers 0 through 7. The smaller the value, the higher the priority. According to the embodiment, the following values are stored in advance. Value 0 is stored in the interrupt priority 53 of the zeroth interrupt register 140. Value 1 is stored in the interrupt priority 53 of the first interrupt register 141. Value 2 is stored in the interrupt priority 53 of the second interrupt register 142. Value 3 is stored in the interrupt priority 53 of the third interrupt register 143. Value 4 is stored in the interrupt priority 53 of the fourth interrupt register 144. Value 5 is stored in the interrupt priority 53 of the fifth interrupt register 145. Value 6 is stored in the interrupt priority 53 of the sixth interrupt register 146. Value 7 is stored in the interrupt priority 53 of the seventh interrupt register 147.

As mentioned above, the interrupt register having the highest interrupt priority is specified from the interrupt registers corresponding to the currently requested interrupt signal. The interrupt controller 14 compares the value of that interrupt register's interrupt priority 53 with a value of the IntLvl register 149. The value of the interrupt priority 53 may be smaller than the value of the IntLvl register 149. That is, the priority of the interrupt priority 53 may be higher than the priority of the IntLvl register 149. In this case, the interrupt controller 14 outputs an interrupt signal preassigned to the specified interrupt register to the CPU 15.

In one case, there may not be available an interrupt register requested to output an interrupt signal. In another case, a value greater than or equal to the value of the IntLvl register 149 may be set to all interrupt priorities 53 for the interrupt registers requested to output an interrupt signal. In these cases, the interrupt controller 14 outputs no interrupt signal.

Different interrupt signals are previously assigned to the zeroth through seventh interrupt registers 140 through 147.

After outputting the interrupt signal, the interrupt controller 14 changes the value of the previous IntLvl register 150 to a value currently stored in the IntLvl register 149. Thereafter, the interrupt controller 14 outputs a priority value corresponding to the most recently output interrupt signal to the previous IntLvl register 150. That is, the priority value is equivalent to a value of the interrupt register's interrupt priority 53 assigned to the interrupt signal.

In this manner, when receiving a request to output an interrupt signal, the interrupt controller 14 specifies an interrupt signal having the highest priority out of interrupt signals requested for output. When the specified interrupt signal's priority is higher than the priority stored in the IntLvl register 149 that stores the priority of the most recently output interrupt signal, the interrupt controller 14 outputs that interrupt signal.

Each interrupt register having the interrupt priority 53 functions as an interrupt priority storage medium to store information about correspondence between an interrupt signal and its priority. The IntLvl register 149 functions as a current priority storage medium that stores the most recently output interrupt signal's priority.

The interrupt controller 14 may receive an interrupt request deletion signal from the CPU 15 or the external input/output circuit 11 to specify any of the zeroth through seventh interrupt registers 140 through 147. In this case, the interrupt controller 14 sets a value of the interrupt mask flag 52 for the specified interrupt register to 1 (on). The interrupt controller 14 becomes conditioned not to accept a request for the interrupt signal corresponding to the interrupt register.

The IntLvl register 149 of the interrupt controller 14 is configured to rewrite its value under rewrite control of the CPU 15. When the interrupt controller 14 detects that the value of the IntLvl register 149 is rewritten under control of the CPU 15, the interrupt controller 14 performs an operation equivalent to that after rewriting the interrupt flag 51 and the like as mentioned above. This rewrite operation occurs in consequence of receiving a signal representing a request to output an interrupt signal from the CPU15 or the external input/output circuit 11.

The disable flag register 148 is configured to rewrite its value under rewrite control of the CPU 15. When the disable flag register 148 contains a value set to 1 (on), the interrupt controller 14 outputs none of interrupt signals corresponding to the zeroth through seventh interrupt registers 140 through 147 to the CPU 15 irrespectively of the description of the above-mentioned operations. When the disable flag register 148 contains a value set to 0 (off), the interrupt controller 14 outputs interrupt signals corresponding to the zeroth through seventh interrupt registers 140 through 147 in accordance with the description of the above-mentioned operations.

Figure 4:
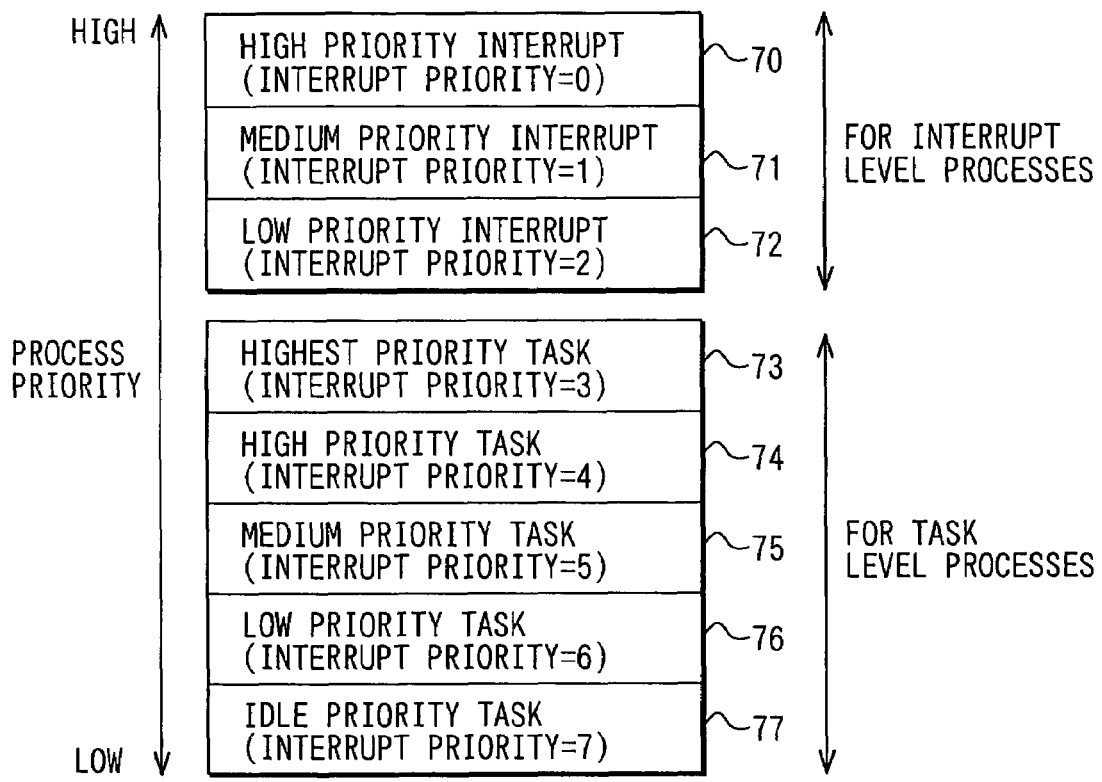
FIG. 4 shows correspondence between an interrupt priority and a program assigned to the interrupt priority.

The operating system according to the embodiment assigns each of interrupt signals, i.e., each of interrupt priorities a program the CPU 15 executes. FIG. 4 shows correspondence between an interrupt priority and a program assigned to the interrupt priority.

In FIG. 4, each of rectangles 70 through 77 corresponds to one interrupt priority. A rectangle placed toward the top in FIG. 4 is assigned a smaller interrupt priority value, i.e., a higher interrupt priority.

A task level process program is assigned to each of interrupt priorities whose value is 3 or greater. The OSEK-OS prescribes a system call that can be used to call a program from another program. This system call is an interface to accept a request to execute the task level process. As will be described later, this interface is called an activate task in the embodiment. The task level process program is configured to start execution using the activate task.

There are five interrupt priorities to which task level process programs are assigned: a highest priority task (interrupt priority=3), a high priority task (interrupt priority=4), a medium priority task (interrupt priority=5), a low priority task (interrupt priority=6), and an idle task (interrupt priority=7). Each interrupt priority is assigned with a plurality of task level process programs.

A task level process program is attached with information indicating to which interrupt priority the task level process program is assigned. The information is stored in the ROM 17. This information can be used to specify the task level process program's priority.

Interrupt level process programs are assigned to interrupt priorities whose value is 2 or smaller. An interrupt level process program starts execution without intermediation of the above-mentioned activate task and based on an interrupt signal from the interrupt controller 14. For example, when the interrupt controller 14 receives a signal from an external device such as the crank sensor 23 via the external input/output circuit 11, the interrupt controller 14 outputs an interrupt signal to the CPU 15 that then starts executing a program. This program is equivalent to the interrupt level process program. Further, when executing a specified interrupt instruction in the CPU allows the CPU to perform an operation similar to that performed when an interrupt signal is received, a program is performed based on execution of the specified interrupt instruction. This program is also equivalent to the interrupt level process program.

There are three interrupt priorities to which interrupt level process programs are assigned: a high priority interrupt (interrupt priority=0), an intermediate priority interrupt (interrupt priority=1), and a low priority interrupt (interrupt priority=2).

The following describes the changeover between execution programs for the CPU 15 using the interrupt controller 14 that performs the above-mentioned operations.

Figure 5:
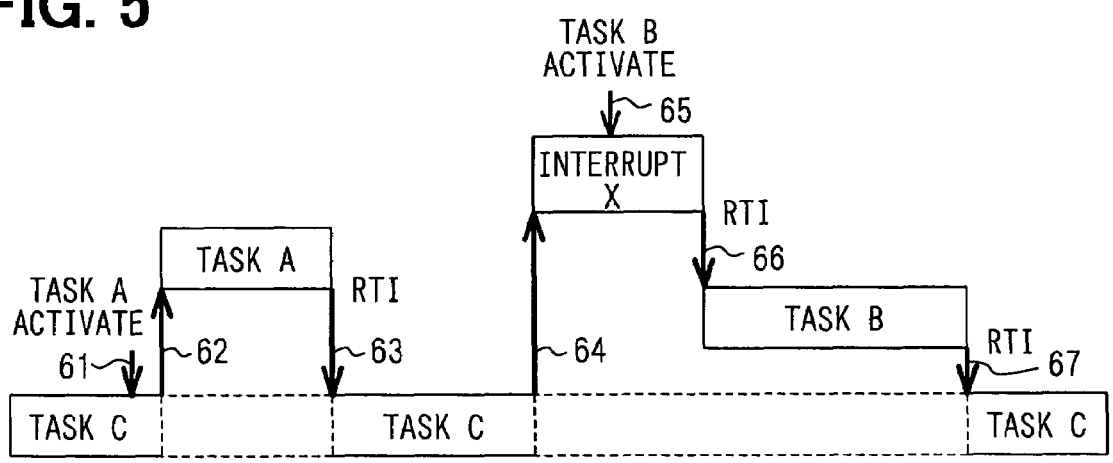
FIG. 5 is a timing chart showing execution timings for tasks A, B, and C, and interrupt X in the CPU.

FIG. 5 shows execution timings for tasks A, B, and C, and interrupt X in the CPU 15 to be described below. Task A is a task level process program assigned to the high priority task (interrupt priority 4). Task B is a task level process program assigned to the medium priority task (interrupt priority 5). Task C is a task level process program assigned to the low priority task (interrupt priority 6). Interrupt X is an interrupt level process program assigned to the medium priority interrupt.

FIG. 5 assumes that the time elapses from the left to the right. A rectangle represents a task executed at each time.

As will be described later, task C calls task A (at the timing corresponding to an arrow 61) during execution of task C. Consequently, task C is interrupted to start executing task A (at the timing corresponding to an arrow 62). When task A terminates execution, task C restarts execution (at the timing corresponding to an arrow 63). Thereafter, execution of task C is interrupted again to start executing interrupt X (at the timing corresponding to an arrow 64).

Thereafter, interrupt X calls task B (at the timing corresponding to an arrow 65). After execution of interrupt X, task B starts executing (at the timing corresponding to an arrow 66). When task B terminates execution, task C restarts execution (at the timing corresponding to an arrow 67).

Figure 6:
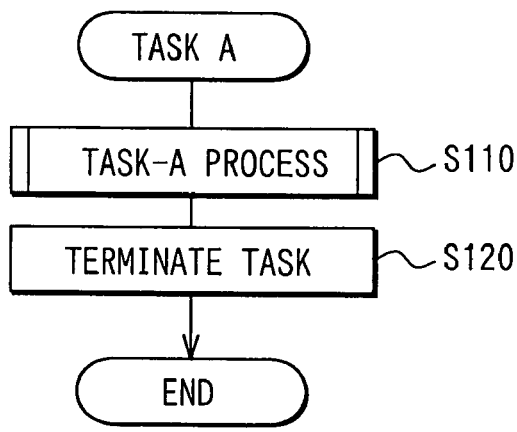
FIG. 6 is a flowchart of task A.

FIGS. 6 through 9 show flowcharts of tasks A through C and interrupt X that perform the above-mentioned operations. FIG. 6 is a flowchart of task A. At Step S110, task A performs a task-A process. The task-A process is one of processes to control the engine 2 such as a process to store information received from the throttle sensor 41 in a specified area of the RAM 16. At Step S120, task A calls a terminate task to terminate the process. The terminate task is an interface provided by the OSEK-OS and is used to terminate program execution and to start execution of the next program. The terminate task will be described in detail.

Figure 7:
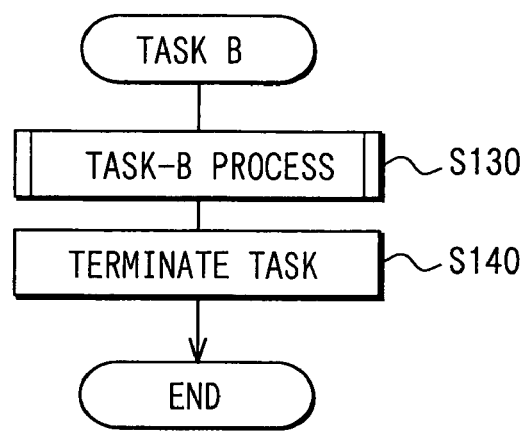
FIG. 7 is a flowchart of task B.

FIG. 7 is a flowchart of task B. At Step S130, task B performs a task-B process. The task-B process is one of processes to control the engine 2 such as a process to output control signals for ignition control, fuel injection control, and throttle angle adjustment to the igniter 21, the injector 22, and the electronic throttle 4, respectively. At Step S140, task B calls the terminate task to terminate the process.

Figure 8:
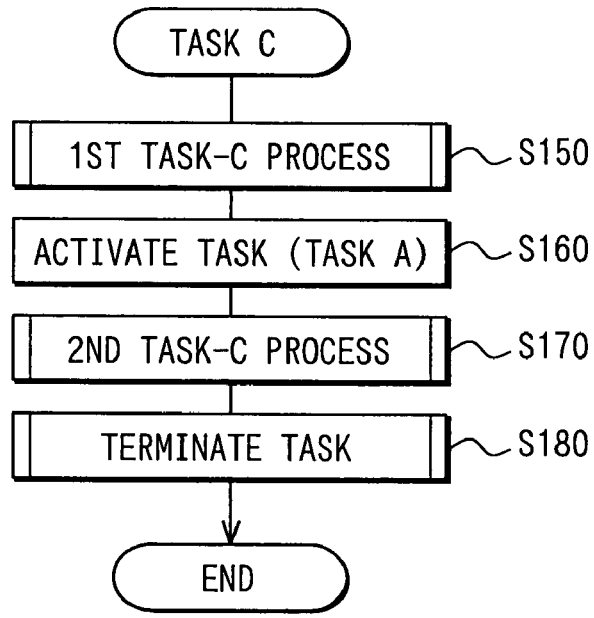
FIG. 8 is a flowchart of task C.

FIG. 8 is a flowchart of task C. At Step S150, task C performs a first task-C process. The first task-C process is one of processes to control the engine 2 such as part of a process to calculate the injection quantity, the fuel ignition timing, the throttle adjustment amount, and the like. Such calculation is performed based on information that is supplied from the crank sensor 23, the water temperature sensor 31, and the throttle sensor 41 and is stored in the RAM 16.

At Step S160, task C calls the above-mentioned activate task. During the call, task C passes information to specify task A as an argument to the activate task. The activate task process will be described in detail.

At Step S170, task C performs a second task-C process. Like the first task-C process, the second task-C process is one of processes to control the engine 2 such as part of a process to calculate the injection quantity, the fuel ignition timing, the throttle adjustment amount, and the like.

At Step S180, task C calls the terminate task to terminate the process.

Figure 9:
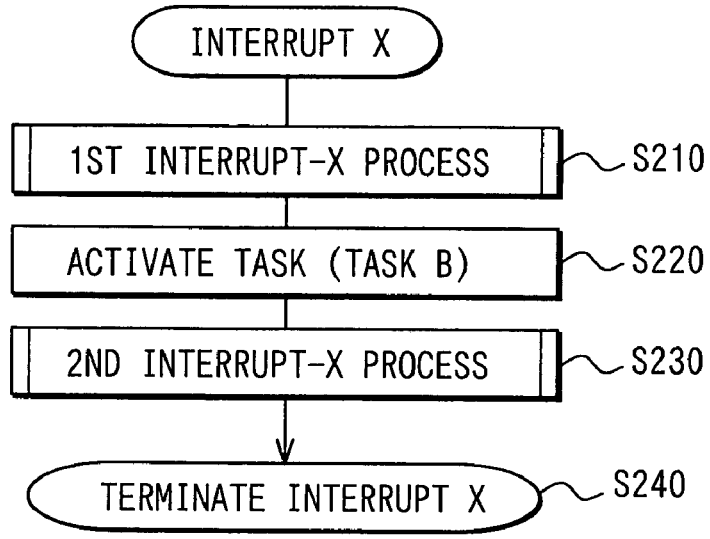
FIG. 9 is a flowchart of interrupt X.

FIG. 9 is a flowchart of interrupt X. Interrupt X is a program in the interrupt vector 171 corresponding to the interrupt signal assigned to the second interrupt register 142. When receiving an interrupt signal from the interrupt controller 14, the CPU 15 specifies a program corresponding to the received interrupt signal from the interrupt vector 171. The CPU 15 starts executing the specified program. Accordingly, the CPU 15 receives the interrupt signal assigned to the first interrupt register 141 to start executing interrupt X.

The CPU 15 saves a context immediately before starting execution of interrupt level process programs such as interrupt X. Specifically, the CPU 15 writes temporary data in its calculation result register and in the RAM 16 to part of the stack 161. The temporary data signifies work data such as a temporary variable used by the most recently executed program.

The CPU 15 restores the context when the interrupt level process program terminates execution. Specifically, the CPU 15 writes the data stored in the stack 161 back to the original areas in the calculation result register and the RAM 16. The data in the stack 161 is written by the context save performed immediately before starting execution of the interrupt level process program.

When the interrupt level process program terminates execution, the CPU 15 rewrites a value of the interrupt flag 51 for the corresponding interrupt register in the interrupt controller 14 to change the value to 0.

During execution of interrupt X, a first interrupt-X process is performed at Step S210. The first interrupt-X process is one of processes to control the engine 2 such as part of a process to store the current time in the RAM 16 as the time to receive a signal from the crank sensor 23.

At Step S220, interrupt X calls the activate task. During the call, interrupt X passes information to specify task B as an argument to the activate task.

At Step S230, interrupt X executes a second interrupt-X process. Like the first interrupt-X process, the second interrupt-X process is one of processes to control the engine 2 such as part of a process to store the current time in the RAM 16 as the time to receive a signal from the crank sensor 23.

At Step S240, interrupt X terminates. Specifically, interrupt X executes an RTI (return interrupt) instruction to rewrite the value of the IntLvl register 149 in the interrupt controller 14 to the value stored in the previous IntLvl register 150. In addition, interrupt X writes values of a program counter buffer and a status register buffer in the RAM 16 to a program counter and a status register in the CPU 15, respectively.

There is provided control to rewrite the value of the IntLvl register 149 of the interrupt controller 14 to the value stored in the previous IntLvl register 150. This control is equivalent to issue process completion notification to the interrupt controller 14.

The program counter provides a storage area to store data indicating the address of an instruction currently executed by the CPU 15. The status register provides a storage area to store information about execution states (error, interrupt, normal operation, and the like) of a program running on the CPU.

Figure 10:
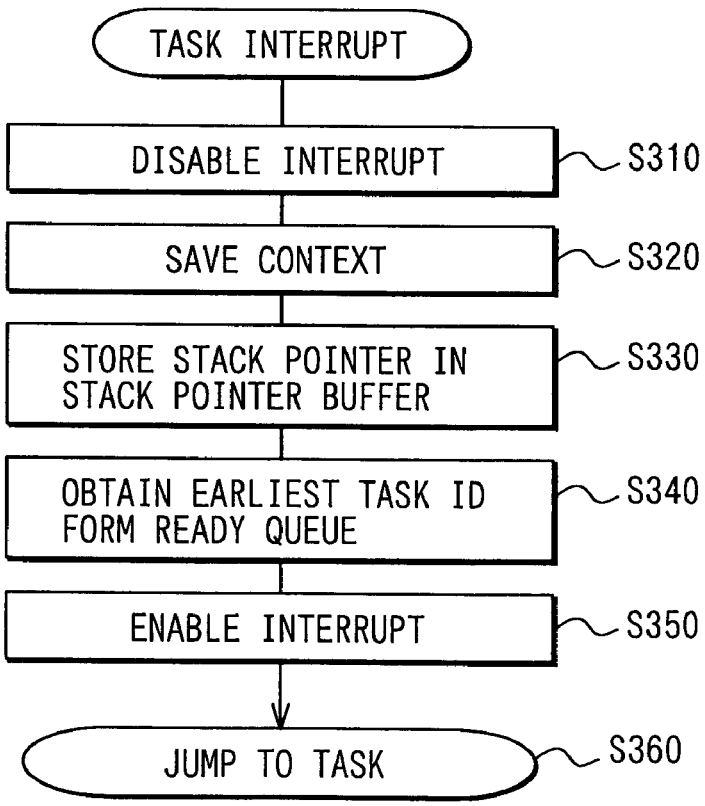
FIG. 10 is a flowchart of a task interrupt program.

FIG. 10 shows a flowchart of a task interrupt program. The CPU 15 executes this program via the interrupt vector 171 when receiving an interrupt signal corresponding to the task level process program.

At Step S310, the task interrupt program disables interrupts. Specifically, the task interrupt program outputs an instruction to the interrupt controller 14 so as to rewrite the disable flag register 148 to 1. The interrupt controller 14 subsequently does not output any interrupt signals corresponding to the zeroth through seventh interrupt registers 140 through 147 until the value of the disable flag register 148 is rewritten to 0 again.

At Step S320, the task interrupt program saves the context. Specifically, the task interrupt program writes the current content of the calculation result register and temporary data in the RAM 16 to part of the stack 161. The temporary data signifies work data such as a temporary variable used by the most recently executed program. This save process rewrites the stack pointer value to an address at the end where data of the stack 161 is written.

At Step S330, the task interrupt program specifically stores the current stack pointer value in a stack pointer buffer of the RAM 16.

At Step S340, the task interrupt program obtains the oldest task ID from the Ready queue 162.

As mentioned above, the Ready queue 162 has as many FIFO buffers as the third through seventh interrupt registers 143 through 147 to which task level process programs are assigned. The FIFO buffers correspond to interrupt signals for the third through seventh interrupt registers 143 through 147. Therefore, the Ready queue 162 has execution wait task information that maintains correspondence between a task level process and its priority.

As will be described later, each FIFO buffer stores a task ID on a first-in first-out basis. The task ID is information to identify a task level process program assigned to the corresponding interrupt register.

Specifically, at Step S340, the task interrupt program reads information about the earliest stored task ID from the FIFO buffer corresponding to an interrupt signal that caused execution of this task interrupt. The task interrupt program deletes that information from that FIFO buffer.

At Step S350, the task interrupt program enables an interrupt. Specifically, the task interrupt program outputs an instruction to rewrite the disable flag register 148 to 0 to the interrupt controller 14. The interrupt controller 14 is subsequently enabled to output interrupt signals corresponding to the zeroth through seventh interrupt registers 140 through 147.

At Step S360, the task interrupt program jumps to the task to terminate execution of the task interrupt. Specifically, the task interrupt program executes a task level process program corresponding to the task ID read at Step S340 to terminate execution of the task interrupt.

The CPU 15 executes such task interrupt to execute the task level process program equivalent to the oldest task ID stored in the FIFO buffer in the Ready queue 162 corresponding to the most recently received interrupt signal.

The interrupt is disabled at Step S310 and is enabled at Step S350. As a result, the program execution is unchanged between Steps 310 and 360 due to an interrupt signal from the zeroth through seventh interrupt registers 140 through 147.

When receiving an interrupt signal from the interrupt controller 14, the CPU 15 not only executes the task interrupt program, but also provides a hardware process. That is, the CPU 15 writes the program counter value to the above-mentioned program counter buffer. Further, the CPU 15 writes the status register value to the above-mentioned status register buffer.

Figure 11:
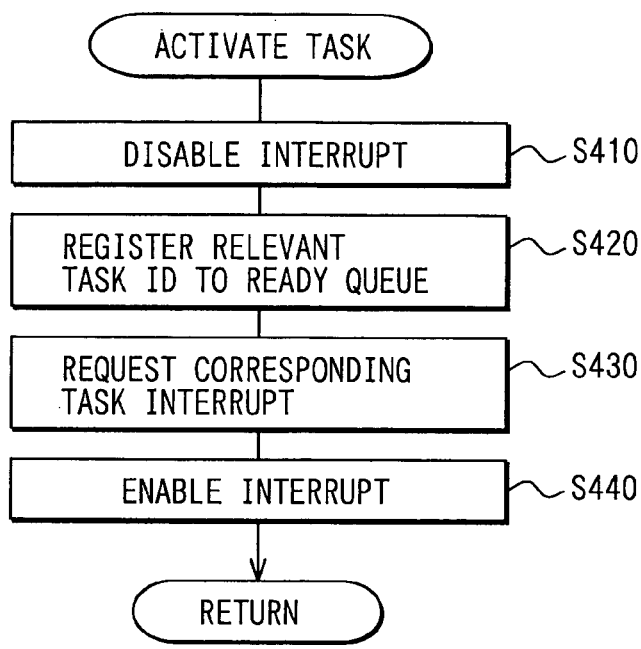
FIG. 11 is a flowchart of a task activation program.

FIG. 11 shows a flowchart of a task activation program, an interface provided by the OSEK-OS to accept requests for executing task level process programs.

At Step S410, the task activation program disables an interrupt.

This process is equivalent to Step S310 in FIG. 10.

At Step S420, the task activation program registers a relevant task ID to the Ready queue 162. The relevant task ID corresponds to task specification included in the argument passed from the program that called the activate task. When the activate task is called at the above-mentioned Step S160 of task C, for example, task A's task ID is assumed to be the relevant task ID. Registration to the Ready queue 162 is specifically implemented by storing the relevant task ID in one of FIFO buffers in the Ready queue 162. The following describes how to determine which FIFO buffer should be used to store the relevant task ID. The ROM 17 stores information about the interrupt priority attached to the task program corresponding to the relevant task ID. This information is read from the ROM 17 to specify the FIFO buffer based on to which interrupt signal the interrupt priority corresponds.

At Step S430, the task activation program requests the corresponding task interrupt. Specifically, the task activation program outputs a control signal to an interrupt register corresponding to the task so that the value of the interrupt flag 51 is set to 1 (on) and the value of the interrupt mask flag 52 is set to 0 (off). This operation is equivalent to outputting to the interrupt controller 14 a request to output an interrupt signal containing the information to specify the interrupt register.

At Step S440, the task activation program enables an interrupt. This process is equivalent to Step S350 in FIG. 10. After Step S440, the activate task process terminates. The CPU 15 continues executing the program that called the activate task.

The CPU 15 executes the above-mentioned task activation program to receive a request to execute the task level process program from the caller program. Based on this request, the CPU 15 stores the task level process' task ID in the FIFO buffer corresponding to the interrupt priority of the task level process (see Step S420). In this manner, the Ready queue 162 stores the task level process and its interrupt priority associated with each other.

Further, the CPU 15 requests the interrupt controller 14 to output an interrupt signal corresponding to the task level process (see Step S430).

Figure 12:
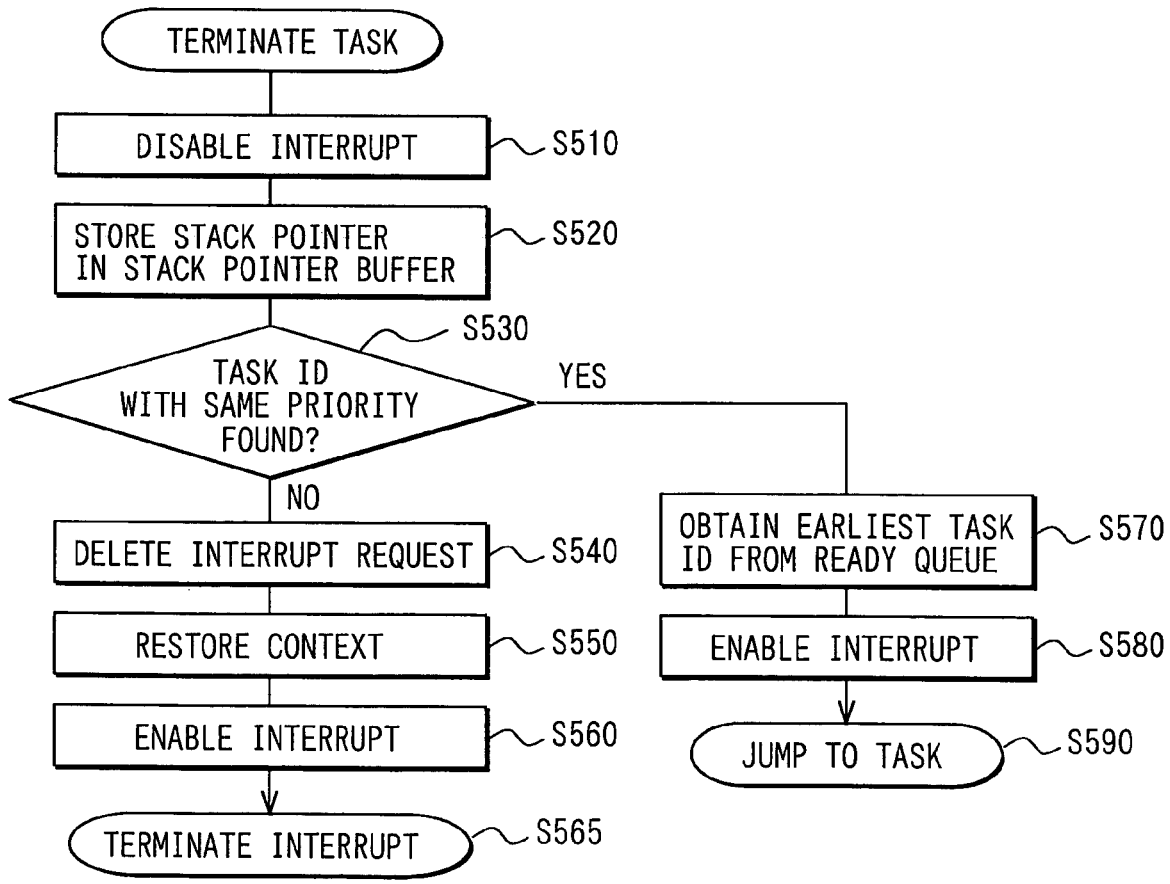
FIG. 12 is a flowchart of a task termination program.

FIG. 12 shows a flowchart of the task termination program used to terminate execution of the task level process program and start executing the next program.

At Step S510, the task termination program disables an interrupt. This process is equivalent to Step S310 in FIG. 10.

At 520, the task termination program writes a stack pointer buffer value to the stack pointer. This returns the stack pointer value to the value before starting execution of the program that called the terminate task. More specifically, the stack pointer value returns to the value immediately after Step S320 in the task interrupt program.

At Step S530, the task termination program determines whether or not the Ready queue 162 contains task IDs with the same interrupt priority. Specifically, it is assumed that the FIFO buffer in the Ready queue 162 stores the task ID of the task level process that called the terminate task. The task termination program determines whether or not the FIFO buffer currently stores the other task IDs. When the other task IDs are stored, the task termination program executes the process at Step S570. Otherwise, the task termination program executes the process at Step S540.

At Step S540, the task termination program outputs an interrupt request deletion signal to the interrupt controller 14. The interrupt request deletion signal contains information to specify an interrupt register corresponding to the interrupt priority of the task level process that called the terminate task.

At Step S550, the task termination program restores the context. Specifically, the stack 161 stores a calculation result register value and temporary data about a task level process executed immediately before execution of the task level process that called the terminate task. The task termination program reads those calculation result register value and temporary data from the stack 161 and returns them to the original positions in the calculation result register and the RAM 16.

At Step S560, the task termination program enables an interrupt. This process is equivalent to Step S350 in FIG. 10.

At Step S565, like Step S240 in FIG. 9, the task termination program executes an RTI instruction and then terminates the terminate task process.

At Step S570, the task termination program obtains the oldest task ID with the same priority from the Ready queue 162. Specifically, the FIFO buffer of the Ready queue 162 stores task IDs for the task level process that called the terminate task. The task termination program reads the earliest stored task ID from the FIFO buffer and deletes that task ID from the FIFO buffer.

At Step S580, the task termination program enables an interrupt like Step S550.

At Step S590, the task termination program jumps to the task to terminate execution of the terminate task. Specifically, the task termination program executes a task level process program equivalent to the task ID read at Step S570 to terminate execution of the task interrupt.

The CPU 15 executes the above-mentioned task termination program to terminate execution of the task level process. There may be a case where the Ready queue 162 stores the task level process associated with the same priority as that of the task level process. In this case, the CPU 15 executes one of the earliest stored task level processes (see Steps 570 and 590). Otherwise, the CPU 15 executes an RTI instruction (see Step S565).

The following describes how executing the above-mentioned programs implements changeover between execution programs for the CPU 15 as shown in FIG. 5.

Let us suppose the following. The CPU 15 executes task C. The zeroth through seventh interrupt registers 140 through 147 of the interrupt controller 14 contain all 1s as values of the interrupt mask flags 52 except 0 for the sixth interrupt register 146. The IntLvl register 149 contains value 6 (low priority task). The Ready queue 162 stores only task C's task ID in the corresponding FIFO buffer.

Executing Step S160 in FIG. 8 executes the activate task. Executing the activate task stores task A's task ID (see Step S420 in FIG. 11) in the FIFO buffer of the Ready queue 162 corresponding to the interrupt priority assigned to task A. Further, the interrupt flag 51 and the interrupt mask flag 52 of the fourth interrupt register 144 corresponding to the interrupt priority are changed to 1 and 0, respectively. This stage is equivalent to the timing indicated by the arrow 61 in FIG. 5.

In this manner, the interrupt controller 14 is conditioned to receive a request of the interrupt priority corresponding to the fourth interrupt register 144. The interrupt controller 14 determines that the fourth interrupt register 144 and the sixth interrupt register 146 maintain the interrupt flag 51 set to 1 and the interrupt mask flag 52 set to 0. The interrupt controller 14 compares interrupt priorities 53 of these interrupt registers to determine that the fourth interrupt register 144 has the highest priority. Further, the interrupt controller 14 determines that the interrupt priority 53 of the fourth interrupt register 144 contains a smaller value than that of the IntLvl register 149. Based on this determination, the interrupt controller 14 rewrites the value of the previous IntLvl register 150 to 6, the current value of the IntLvl register 149. The interrupt controller 14 rewrites the value of the IntLvl register 149 to 4, the current value of the interrupt priority 53 of the fourth interrupt register 144. Further, the interrupt controller 14 outputs the interrupt signal corresponding to the fourth interrupt register 144 to the CPU 15.

While executing task C, the CPU 15 receives the interrupt signal to save values of the program counter and the status register in the program counter buffer and the status register buffer, respectively. In addition, the CPU 15 executes the task interrupt program as shown in FIG. 10 via the interrupt vector 171. The CPU 15 retrieves task A's task ID and deletes it. This task ID is the oldest one stored in the FIFO buffer of the Ready queue 162 corresponding to the interrupt signal. The CPU 15 then executes task A, i.e., the task corresponding to the relevant task ID. This stage is equivalent to the timing indicated by the arrow 62 in FIG. 5.

When task A terminates execution, Step S140 in FIG. 7 is executed to start execution of the terminate task. The terminate task determines whether or not the FIFO buffer corresponding to the calling task A is empty (see Step S530 in FIG. 12). Based on this determination, the terminate task restores the context (see Step S550). This process restores the calculation result register and the like of the CPU 15 and temporary data in the RAM 16 to those used when task C was interrupted. The CPU 15 then outputs an interrupt request deletion signal to the interrupt controller 14 (see Step S540). As a result, the interrupt controller 14 places 1 in the interrupt mask flag 52 of the fourth interrupt register 144.

The CPU 15 executes an RTI instruction (see Step S565). This returns the values of the program counter and the status register to those used when task C was interrupted. The value of the IntLvl register 149 returns to 6, i.e., the value of the previous IntLvl register 150. The interrupt controller 14 then determines that only the sixth interrupt register 146 maintains the interrupt flag 51 set to 1 and the interrupt mask flag 52 set to 0. Further, the interrupt controller 14 outputs no interrupt signal to the CPU 15 based on the fact that the same value is used for the interrupt priority 53 of the sixth interrupt register 146 and that of the IntLvl register 149.

The CPU 15 restarts execution of task C from the position corresponding to the program counter value. This stage is equivalent to the timing indicated by the arrow 63 in FIG. 5.

While task C is being executed, the interrupt controller 14 may receive a pulse signal from the crank sensor 23, for example. The interrupt controller 14 places value 1 (on) in the interrupt flag 51 for the interrupt register (e.g., the first interrupt register 141) corresponding to the pulse signal.

In this manner, the interrupt controller 14 is conditioned to receive a request of the interrupt priority corresponding to the first interrupt register 141. The interrupt controller 14 determines that the first interrupt register 141 and the sixth interrupt register 146 maintain the interrupt flag 51 set to 1 and the interrupt mask flag 52 set to 0. The interrupt controller 14 compares interrupt priorities 53 of these interrupt registers to determine that the first interrupt register 141 has the highest priority. Further, the interrupt controller 14 determines that the interrupt priority 53 of the first interrupt register 141 contains a smaller value than that of the IntLvl register 149. Based on this determination, the interrupt controller 14 rewrites the value of the previous IntLvl register 150 to 6, the current value of the IntLvl register 149. The interrupt controller 14 rewrites the value of the IntLvl register 149 to 1, the current value of the interrupt priority 53 of the first interrupt register 141. Further, the interrupt controller 14 outputs the interrupt signal corresponding to the first interrupt register 141 to the CPU 15.

While executing task C, the CPU 15 receives the interrupt signal to save values of the program counter and the status register in the program counter buffer and the status register buffer, respectively. In addition, the CPU 15 starts executing the interrupt-X program via the interrupt vector 171. This stage is equivalent to the timing indicated by the arrow 64 in FIG. 5.

Thereafter, interrupt X executes Step S220 in FIG. 9 to execute the activate task. Executing the activate task stores task B's task ID in the FIFO buffer of the Ready queue 162 corresponding to the interrupt priority assigned to task B (see Step S420 in FIG. 11). Further, the activate task changes the interrupt flag 51 and the interrupt mask flag 52 to 1 and 0 respectively in the fifth interrupt register 145 corresponding to the interrupt priority. This stage is equivalent to the timing indicated by the arrow 65 in FIG. 5.

In this manner, the interrupt controller 14 is conditioned to receive a request of the interrupt priority corresponding to the fifth interrupt register 145. The interrupt controller 14 determines that the first interrupt register 141, the fifth interrupt register 145, and the sixth interrupt register 146 maintain the interrupt flag 51 set to 1 and the interrupt mask flag 52 set to 0. The interrupt controller 14 compares interrupt priorities 53 of these interrupt registers to determine that the first interrupt register 141 has the highest priority. Further, the interrupt controller 14 determines that the same value is used for the interrupt priority 53 of the first interrupt register 141 and that of the IntLvl register 149. At this time, therefore, the interrupt controller 14 outputs no interrupt signal to the CPU 15. Since interrupt X is more highly prioritized than task B, task B is not executed during execution of interrupt X.

When interrupt X terminates execution, the CPU 15 executes an RTI instruction (see Step S240 in FIG. 9). In this manner, the values of the program counter and the status register return to those used when task C was interrupted second. The value of the IntLvl register 149 returns to 6, i.e., the value of the previous IntLvl register 150.

The interrupt controller 14 then determines that only the fifth interrupt register 145 and the sixth interrupt register 146 maintain the interrupt flag 51 set to 1 and the interrupt mask flag 52 set to 0. Further, the interrupt controller 14 determines that the interrupt priority 53 of the fifth interrupt register 145 contains a smaller value than the interrupt priority 53 of the sixth interrupt register 146. The interrupt priority 53 of the fifth interrupt register 145 contains a smaller value than the value of the IntLvl register 149. Based on this, the interrupt controller 14 outputs an interrupt signal corresponding to the fifth interrupt register 145 to the CPU 15.

The CPU 15 receives the interrupt signal to save values of the program counter and the status register in the program counter buffer and the status register buffer, respectively. In addition, the CPU 15 starts executing the task interrupt program as shown in FIG. 10 via the interrupt vector 171. The CPU 15 retrieves task B's task ID and deletes it. This task ID is the oldest one stored in the FIFO buffer of the Ready queue 162 corresponding to the interrupt signal. The CPU 15 then executes task B, i.e., the task corresponding to the relevant task ID. This stage is equivalent to the timing indicated by the arrow 66 in FIG. 5.

When task B terminates execution, the terminate task is executed. At the timing indicated by the arrow 67, the process for task B terminates to restart the process for task C. This process is similar to the process performed when task A terminates at the timing indicated by the arrow 63 to start executing task C.

There has been described the implementation of changeover between the execution programs for the CPU 15 as shown in FIG. 5.

In FIG. 5, task C changes over to task A when the activate task requests the interrupt controller 14 to output an interrupt signal at the timing indicated by the arrow 61. According to a conventional activate task, the CPU 15 executes a software process to compare priorities between task level processes. Based on the result, the CPU 15 implements a task level process to be executed. By contrast, the embodiment allows the interrupt controller 14 to compare interrupt priorities with each other.

In one case, task A returns to task C for execution. In another case, interrupt X changes over to task B for execution. In yet another case, task B returns to task C for execution. In these cases, the CPU 15 executes an RTI instruction in the terminate task (see Step S565 in FIG. 12) or directly (see Step S240 in FIG. 9). In this manner, the interrupt controller 14 compares interrupt priorities with each other. Based on the comparison result, the CPU 15 changes the execution tasks. According to a conventional terminate task, like the conventional activate task, the CPU 15 executes a software process to compare priorities between task level processes. Based on the result, the CPU 15 implements a task level process to be executed. By contrast, the embodiment allows the interrupt controller 14 to compare interrupt priorities with each other.

When requested to execute the task level process, the CPU 15 executes the activate task to request the interrupt controller 14 to output an interrupt signal corresponding to the task level process. When accepting requests, the interrupt controller 14 specifies the most highly prioritized one of the accepted requests. When the specified request has a smaller value of the interrupt priority 53 than the value of the IntLvl register 149, the interrupt controller 14 outputs an interrupt signal concerning the specified request. The CPU executes a process corresponding to the interrupt signal from the interrupt controller 14. In other words, the CPU 15 allows the interrupt controller 14 to compare priorities of the task level processes. Using the multi-interrupt function of the interrupt controller 14 can decrease the time consumed for task scheduling by the CPU 15 that changes over a plurality of tasks for execution.

When the task level process completes execution, the CPU 15 executes an RTI instruction. The interrupt controller 14 specifies the most highly prioritized one of the interrupt signals requested for output. The interrupt controller 14 outputs the specified interrupt signal when its value of the interrupt priority 53 is smaller than the value of the IntLvl register 149. Accordingly, the CPU allows the interrupt controller 14 to compare priorities of the task level processes.

Referring now to the example in FIG. 5, the following describes a case where an activate task is called during execution of task B. This activate task is assumed to have an argument in terms of task D assigned to the same interrupt priority as for task B. In this case, executing the activate task stores task D's task ID in the FIFO buffer corresponding to task B. When task B terminates, the terminate task is executed at Step S530 in FIG. 12 to determine that another task ID is contained in the FIFO buffer for the same interrupt priority as task B. At Step S570, the terminate task reads the corresponding task D's task ID from the FIFO buffer. At Step S590, that task D starts executing.

When one task processing program terminates, the FIFO buffer with the same interrupt priority may successively store an task ID of a different task processing program. In such case, that different task processing program is executed successively without saving the context of the former task processing program, requesting an interrupt for the interrupt controller 14, or deleting an interrupt request. The reason follows. The FIFO buffer contains the task ID for a task processing program having the same priority as for the currently executing task processing program. This means that task processing programs in the FIFO buffer start executing always from the beginning. In this manner, it is possible to alleviate process loads on the CPU such as saving contexts.

According to the embodiment, either value 1 or 0 is used for the interrupt mask flag 52 of the interrupt controller 14. It is assumed that the interrupt controller 14 receives a request to output an interrupt signal for the task level process with a given interrupt priority. Even when the interrupt controller 14 receives another request to output an interrupt signal for the task level process with the same interrupt priority, the value of the interrupt mask flag 52 is unchanged. Suppose that, when each time one of task level processes with the interrupt priority terminates, a process equivalent to Step S540 in FIG. 12 always changes the interrupt mask flag 52 of the corresponding interrupt register to 1. In this case, it seems that the interrupt controller 14 is not requested for output of subsequent interrupt signals.

The embodiment solves this problem that occurs when task level processes with the same interrupt priority are requested in a multiple manner by the following. Even when one of the task level processes is complete, no interrupt register is deleted and then the later requested task level process is executed successively.

Second Embodiment

The following describes a second embodiment of the present invention. The second embodiment differs from the first embodiment in the following. The CPU 15 rewrites the IntLvl register 149 of the interrupt controller 14 so as to artificially increase the priority of the currently executed task level process to a specified priority.

It may become necessary to artificially increase the priority of the currently executed task level process to a specified priority. For example, task level processes with different priorities are configured to use the same resource of the engine ECU 1. That is, the resource is shared by task level processes with different priorities. The resource of the engine ECU 1 signifies a physical device used by the CPU 15 in the engine ECU 1. The resource includes the RAM 16 of the microcomputer 12, a specified area in EEPROM (not shown), the external input/output circuit 11, and a communication device to communicate with another ECU in a vehicle (not shown).

While a task level process with a low interrupt priority is executed in this case, it may be requested to execute another task level process with a higher interrupt priority. There may be a need to prevent the resource used by the lowly prioritized task level process from interruptedly being used by the other task level process. That is, any task level process may need to exclusively use the shared resource.

To solve this problem, the OSEK-OS according to the embodiment provides a resource acquisition program and a resource release program. These programs function as an interface to exclusively use the resource by avoiding competitive access to the resource between task level processes.

The task level process with a low interrupt priority calls the resource acquisition program to start exclusively using the resource. The task level process calls the resource release program to make the used resource available to the other task level processes. An argument is passed to the resource acquisition program and the resource release program. The argument specifies a resource whose exclusive use is to be started or ended.

Figure 13:
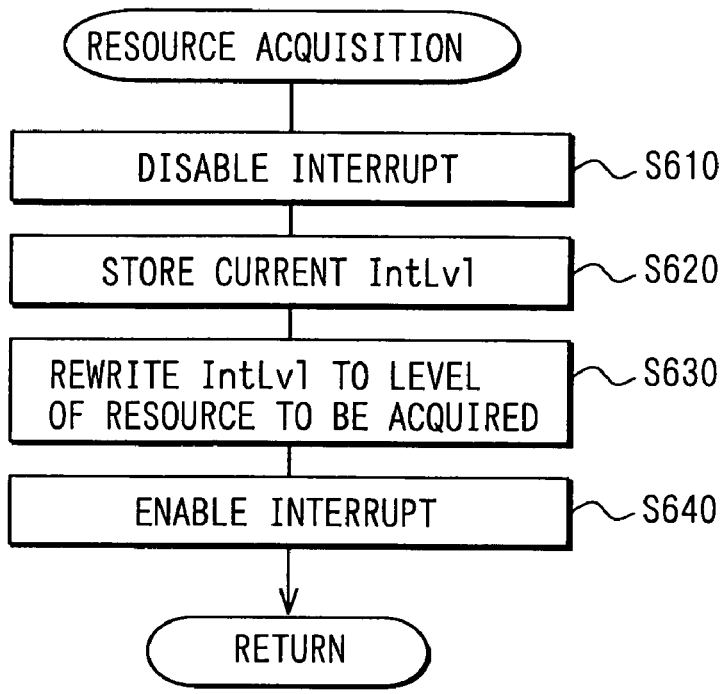
FIG. 13 is a flowchart of a resource acquisition program according to a second embodiment.

FIG. 13 shows a flowchart of the resource acquisition program.

When the resource acquisition program is called, the CPU 15 disables an interrupt at Step S610. This process is equivalent to Step S310 in FIG. 10.

At Step S620, the process allows the RAM 16 to store the current value in the IntLvl register 149 of the interrupt controller 14.

At Step S630, the process rewrites the value of the IntLvl register 149 to a level of the resource to be obtained. The resource to be obtained is one that is currently intended for exclusive use and is passed as an argument from a caller of the resource acquisition program. The resource level is a value of the interrupt priority assigned to each resource of the engine ECU 1. This value equals the highest one of interrupt priorities for task level processes that share the resource. The resource levels are predetermined at the design stage of the engine ECU 1. The ROM 17 stores the information about the resource levels.

At Step S640, the process enables an interrupt. This process is equivalent to Step S350 in FIG. 10. The program then terminates execution. The CPU 15 restarts execution of the caller program.

The CPU 15 executes the resource acquisition program. Consequently, the IntLvl register 149 stores a value indicating a higher priority than the interrupt priority of the actually executed task level process.

At this time, it is considered that the CPU 15 issues a request to the interrupt controller 14 to output an interrupt signal corresponding to the other task level process using the resource. The value of the IntLvl register 149 indicates a priority higher than or equal to the interrupt signal's interrupt priority. This is because the value of the IntLvl register 149 indicates the highest one of priorities for task level processes sharing the resource. There is no task level process that indicates a higher priority than that highest priority and uses the resource.

As a result of comparison between the IntLvl register 149 and the value of interrupt priority 53 for the interrupt register corresponding to the interrupt signal, the interrupt controller 14 outputs no interrupt signal. The task level process that called the resource acquisition program becomes able to use the resource by excluding the use by the other task level processes.

Figure 14:
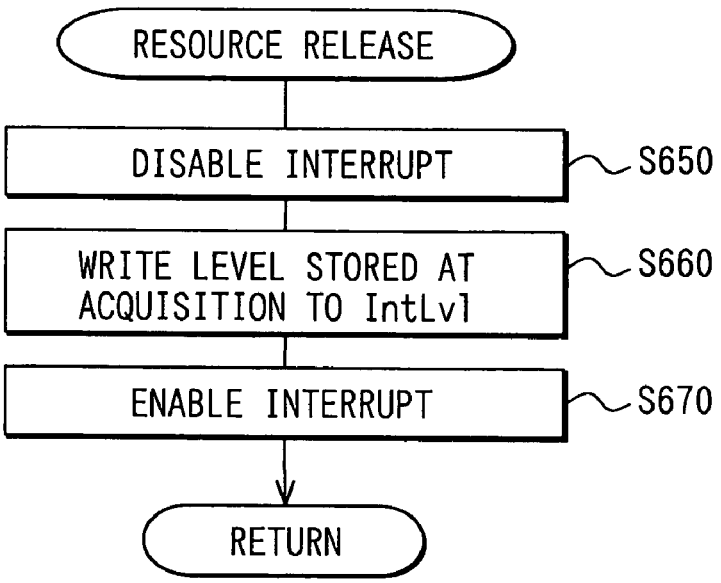
FIG. 14 is a flowchart of a resource release program according to the second embodiment.

FIG. 14 shows a flowchart of the resource release program.

When the resource release program is called, the CPU 15 disables an interrupt at Step S650. This process is equivalent to Step S310 in FIG. 10.

When the resource is obtained, the RAM 16 stores the value of the IntLvl register 149. At Step S660, the process writes that value to the IntLvl register 149.

At Step S670, the process enables an interrupt. This process is equivalent to Step S350 in FIG. 10. The program then terminates execution. The CPU 15 restarts execution of the caller program.

Executing the resource release program returns the value of the IntLvl register 149 to the value used before the resource acquisition. There may be a request to output an interrupt signal corresponding to the task level process using the resource between a call to the resource acquisition program and a call to the resource release program. In such case, that task level process can be executed immediately after execution of the resource release program. That is, the other task level processes become able to use the resource.

Third Embodiment

The following describes a third embodiment of the present invention. The following description covers only a difference in the third embodiment from the second embodiment. According to the third embodiment like the second embodiment, the OSEK-OS provides the resource acquisition program and the resource release program as interfaces to artificially increase the priority of the currently executed task level process to a specified priority.

However, the resource acquisition program according to the third embodiment differs from that according to the second embodiment in the following. The resource acquisition program enables an exclusive use of the resource by rewriting a value of the interrupt priority 53 for the interrupt register in the interrupt controller 14 to a priority lower than or equal to the priority of the currently executed task level process.

Under rewrite control of the CPU 15, the interrupt controller 14 according to the embodiment rewrites values of the interrupt priorities 53 for the third through seventh interrupt registers 143 through 147. The interrupt controller 14 may detect that the value of the interrupt priority 53 is rewritten under control of the CPU 15. As described in the first embodiment, the interrupt controller 14 performs an operation equivalent to the operation after rewriting the interrupt flag 51 and the like in consequence of receiving a signal representing a request to output an interrupt signal from the CPU15 or the external input/output circuit 11.

Figure 15:
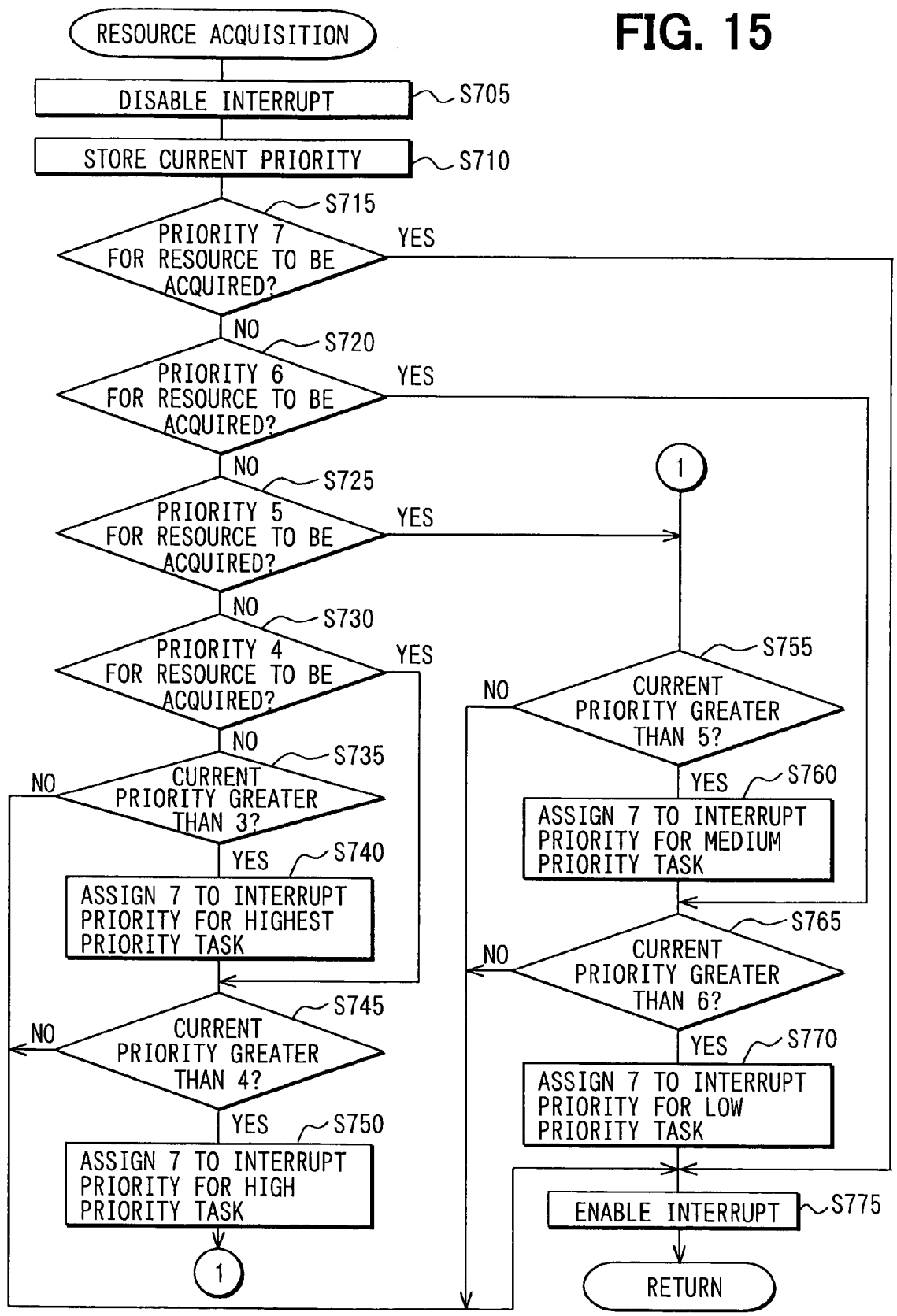
FIG. 15 is a flowchart of a resource acquisition program according to a third embodiment.

FIG. 15 shows a flowchart of the resource acquisition program.

When the resource acquisition program is called, the CPU 15 disables an interrupt at Step S705. This process is equivalent to Step S310 in FIG. 10.

At Step S710, the program stores the interrupt priority of the currently executing task level process in the RAM 16.

At Step S715, the program determines whether or not the resource to be obtained has a priority value of 7 (equivalent to the idle task's priority). When the priority is 7, the program executes the process at Step S775. When the priority is not 7, the program executes the process at Step S720.

At Step S720, the program determines whether or not the resource to be obtained has a priority value of 6 (equivalent to the low priority task's priority). When the priority is 6, the program executes the process at Step S765. When the priority is not 6, the program executes the process at Step S725.

At Step S725, the program determines whether or not the resource to be obtained has a priority value of 5 (equivalent to the medium priority task's priority). When the priority is 5, the program executes the process at Step S755. When the priority is not 5, the program executes the process at Step S730.

At Step S730, the program determines whether or not the resource to be obtained has a priority value of 4 (equivalent to the high priority task's priority). When the priority is 4, the program executes the process at Step S745. When the priority is not 4, the program executes the process at Step S735.

At Step S710, the RAM 16 stores the interrupt priority value for the currently executing task level process. At Step S735, the program determines whether or not the interrupt priority value stored in the RAM 16 is greater than 3 (a priority lower than the highest priority task). When the interrupt priority value is greater than 3, the program executes the process at Step S740. When the interrupt priority value is smaller than or equal to 3, the program executes the process at Step S775.

At Step S740, the program assigns value 7 to the interrupt priority for the highest priority task. Specifically, the program provides control to rewrite the value of the interrupt priority 53 for the third interrupt register 143 to 7.

At Step S710, the RAM 16 stores the interrupt priority value for the currently executing task level process. At Step S745, the program determines whether or not the interrupt priority value stored in the RAM 16 is greater than 4 (less prioritized than the high priority task). When the interrupt priority value is greater than 4, the program executes the process at Step S750. When the interrupt priority value is smaller than or equal to 4, the program executes the process at Step S775.

At Step S750, the program assigns value 7 to the interrupt priority for the high priority task. Specifically, the program provides control to rewrite the value of the interrupt priority 53 for the third interrupt register 144 to 7.

At Step S710, the RAM 16 stores the interrupt priority value for the currently executing task level process. At Step S755, the program determines whether or not the interrupt priority value stored in the RAM 16 is greater than 5 (less prioritized than the medium priority task). When the interrupt priority value is greater than 5, the program executes the process at Step S760. When the interrupt priority value is smaller than or equal to 5, the program executes the process at Step S775.

At Step S760, the program assigns value 7 to the interrupt priority for the medium priority task. Specifically, the program provides control to rewrite the value of the interrupt priority 53 for the third interrupt register 145 to 7.

At Step S710, the RAM 16 stores the interrupt priority value for the currently executing task level process. At Step S765, the program determines whether or not the interrupt priority value stored in the RAM 16 is greater than 6 (less prioritized than the low priority task). When the interrupt priority value is greater than 6, the program executes the process at Step S770. When the interrupt priority value is smaller than or equal to 5, the program executes the process at Step S775.

At Step S770, the program assigns value 7 to the interrupt priority for the low priority task. Specifically, the program provides control to rewrite the value of the interrupt priority 53 for the third interrupt register 146 to 7.

At Step S775, the program enables an interrupt. This process is equivalent to Step S350 in FIG. 10. After Step S775, the program terminates execution. The CPU 15 restarts execution of the caller task level process.

Let us assume an interrupt signal having a priority that is higher than the interrupt priority of the currently executing task level process (i.e., the task level process that called the resource acquisition program) and is lower than or equal to the priority of the resource to be obtained. The CPU 15 executes the above-mentioned resource acquisition program to change the value of the interrupt priority 53 for the interrupt register corresponding to that interrupt signal to 7 (an idle task with the lowest priority).

A case is considered where the CPU 15 requests the interrupt controller 14 to output an interrupt signal corresponding to the other task level process using the resource. At this time, value 7 is placed in the interrupt priority 53 of the interrupt register corresponding to the interrupt signal. The value of the IntLvl register 149 corresponds to the priority for the task level process that called the resource acquisition program.

As a result of comparison between the IntLvl register 149 and the value of interrupt priority 53 for the interrupt register corresponding to the interrupt signal, the interrupt controller 14 outputs no interrupt signal. The task level process that called the resource acquisition program becomes able to use the resource by excluding the use by the other task level processes.

Figure 16:
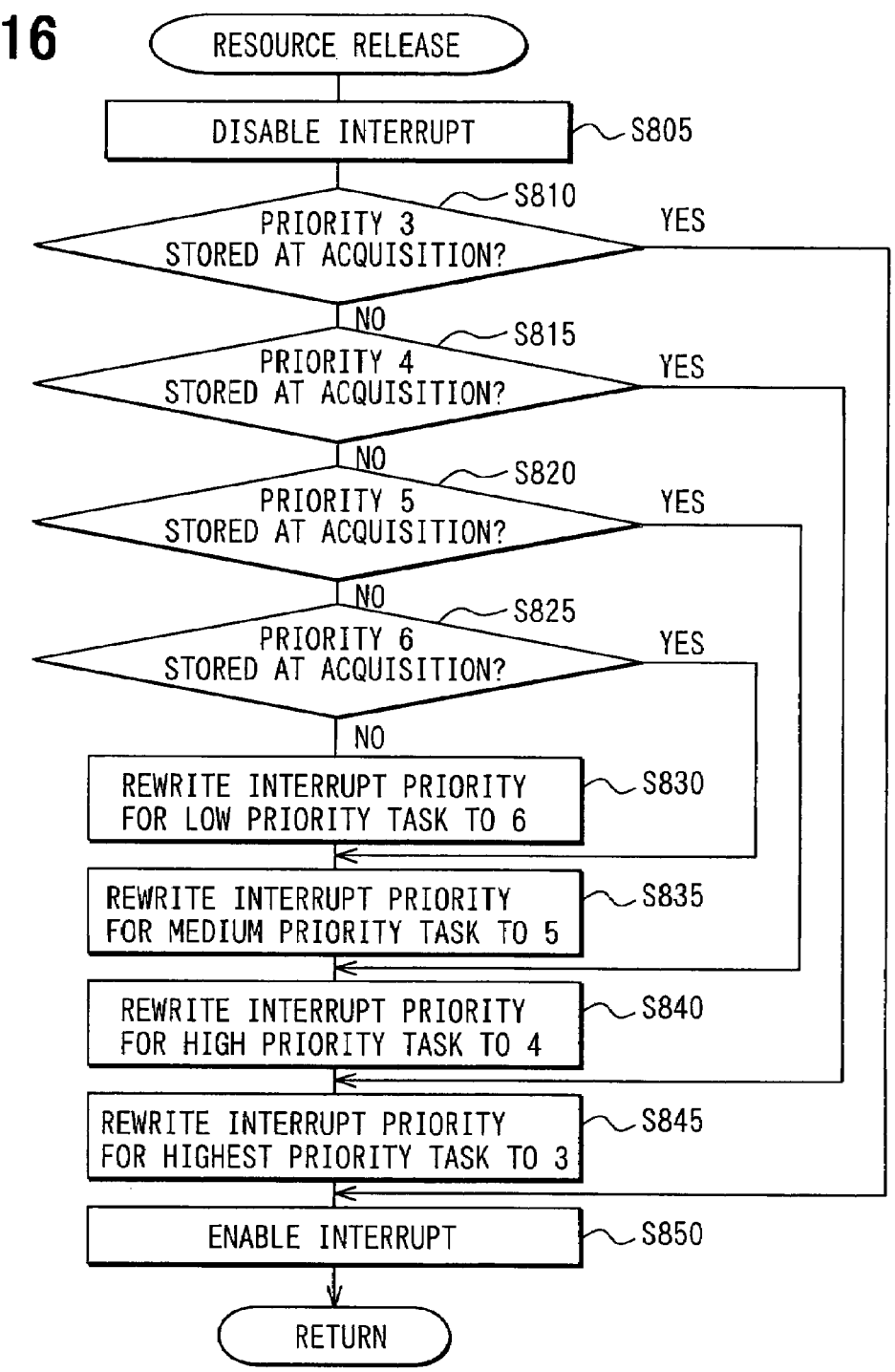
FIG. 16 is a flowchart of a resource release program according to the third embodiment.

FIG. 16 shows a flowchart of the resource release program according to the embodiment. When the resource release program is called, the CPU 15 disables an interrupt at Step S805. This process is equivalent to Step S310 in FIG. 10.

At Step S810, the program determines whether or not the priority stored at the resource acquisition is 3 (indicating the highest priority task). That is, the priority is equivalent to the value of the IntLvl register 149 stored in the RAM 16 at Step S710 of the most recent resource release program. When the priority is 3, the program executes the process at Step S850. Otherwise, the program executes the process at Step S815.

At Step S815, the program determines whether or not the priority stored at the resource acquisition is 4 (indicating the high priority task). When the priority is 4, the program executes the process at Step S845. Otherwise, the program executes the process at Step S820.

At Step S820, the program determines whether or not the priority stored at the resource acquisition is 5 (indicating the medium priority task). When the priority is 5, the program executes the process at Step S840. Otherwise, the program executes the process at Step S825.

At Step S825, the program determines whether or not the priority stored at the resource acquisition is 6 (indicating the low priority task). When the priority is 6, the program executes the process at Step S835. Otherwise, the program executes the process at Step S830.

At Step S830, the program rewrites the value of the interrupt priority for the low priority task to 6. That is, the priority is equivalent to the interrupt priority 53 for the sixth interrupt register 146.

At Step S835, the program rewrites the value of the interrupt priority for the medium priority task to 5. That is, the priority is equivalent to the interrupt priority 53 for the fifth interrupt register 145.

At Step S840, the program rewrites the value of the interrupt priority for the high priority task to 4. That is, the priority is equivalent to the interrupt priority 53 for the fourth interrupt register 144.

At Step S845, the program rewrites the value of the interrupt priority for the highest priority task to 3. That is, the priority is equivalent to the interrupt priority 53 for the third interrupt register 143.

At Step S850, the process enables an interrupt. This process is equivalent to Step S350 in FIG. 10. The program then terminates execution. The CPU 15 restarts execution of the caller task level process.

Let us assume an interrupt signal having a priority that is higher than the interrupt priority of the task level process calling the resource release program and is lower than or equal to the priority of the resource to be obtained. The CPU 15 executes the above-mentioned resource acquisition program to return the value of the interrupt priority 53 for the interrupt register corresponding to that interrupt signal to the value used before the resource acquisition program was called. As a result, interrupt priorities 53 of the third through seventh interrupt registers 143 through 147 contain values 3, 4, 5, 6, and 7, respectively. For example, the task level process has a higher interrupt priority and uses the resource. There may be a request to output an interrupt signal corresponding to such task level process between a call to the resource acquisition program and a call to the resource release program. In this case, the task level process is executed immediately after execution of the resource release program. That is, the other task level processes become able to use the resource.

Fourth Embodiment

The following describes a fourth embodiment of the present invention. The following description covers only a difference in the fourth embodiment from the first embodiment. According to the first embodiment, the same interrupt signal is assigned with a plurality of types of task level processes. According to the fourth embodiment, one interrupt signal is assigned with only one task level process. In addition, one priority is assigned with only one task level process. Therefore, the total number of task level processes executed in the CPU 15 equals the number of interrupt registers for the task level processes.

Figure 17:
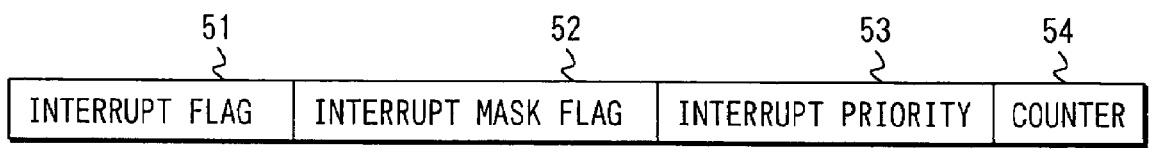
FIG. 17 shows a data storage format for zeroth to seventh interrupt registers according to a fourth embodiment.

When each task level process is provided with the priority and the interrupt signal in this manner, task scheduling is performed using the multi-interrupt function. FIG. 17 shows a data storage format for interrupt registers in the interrupt controller 14 according to the fourth embodiment.

The interrupt controller 14 contains an interrupt register for task level processes. The interrupt register comprises data areas such as an interrupt flag 51, an interrupt mask flag 52, an interrupt priority 53, and a counter 54. The same data as described in the first embodiment are contained in the interrupt flag 51, the interrupt mask flag 52, and the interrupt priority 53.

Operations of the interrupt controller 14 according to the fourth embodiment are the same as those of the interrupt controller 14 according to the first embodiment. However, the interrupt controller 14 rewrites values stored in the interrupt register as follows when receiving a request to output in interrupt signal and receiving an interrupt request deletion signal.

It is assumed that the interrupt controller 14 receives a signal representing a request to output an interrupt signal for the task level process from the CPU 15. Based on information contained in the request signal, the interrupt controller 14 determines which of the zeroth through seventh interrupt registers 140 through 147 the request signal specifies. The counter 54 of the specified interrupt register stores a value. The interrupt controller 14 increments this value by one grade (e.g., 1). Based on the request to output the interrupt signal at this time, the interrupt flag 51 and the interrupt mask flag 52 are set to values 1 (on) and 0 (off), respectively.

The interrupt controller 14 receives an interrupt request deletion signal from the CPU 15 or the external input/output circuit 11. Based on information contained in the request signal, the interrupt controller 14 determines which of the zeroth through seventh interrupt registers 140 through 147 the request signal specifies. The counter 54 of the specified interrupt register stores a value. The interrupt controller 14 decrements this value by one grade (e.g., 1). The counter 54 may contain a value (e.g., 0) indicating the state of not accepting the request for the interrupt signal corresponding to the interrupt register. In such case, the interrupt controller 14 rewrites the value of the interrupt flag 51 to 0.

These operations of the interrupt controller 14 allow the counter 54 to function as a count storage medium to store counting data for each interrupt signal.

According to the embodiment, the RAM 16 has no area for the Ready queue 162.

According to the embodiment with respect to this, the CPU 15 does not execute the process at Step S340 during execution of the task interrupt as shown in FIG. 10. Instead, at Step S360, the CPU 15 starts executing only the task corresponding to the received interrupt signal.

Further, the CPU 15 does not execute the process at Step S420 during execution of the activate task as shown in FIG. 11.

Moreover, the CPU 15 does not execute the process at Steps 530, 570, 580, and 590 during execution of the terminate task as shown in FIG. 12. Instead, the CPU 15 executes the process at Step S520 and then at Step S540.

In this construction, the interrupt controller 14 receives a request to output the interrupt signal corresponding to a task level process. The interrupt controller 14 increments by one grade a counting data value for the interrupt signal. The interrupt controller 14 becomes configured to decrement by one grade the counting data value for the interrupt signal at a specified timing after output of a given interrupt signal to the instruction execution unit. Specifically, the specified timing is used to execute the process at Step S540 in FIG. 12.

In this manner, the counter 54 reflects the number of execution requests even when a request is issued to start a plurality of occurrences of the same task level process program. Therefore, the CPU 15 can implement the task scheduling for a plurality of occurrences of the same task level process without using the Ready queue 162. According to the embodiment, the CPU 15 need not count requests through software (specifically, the above-mentioned process at Steps 340, 360, and 570) to execute the same task level process. Processing loads on the CPU 15 are decreased. There is no need to determine (specifically, the above-mentioned process at 530) whether or not an interrupt signal needs to be requested. Processing loads on the CPU 15 are further decreased.

It may be preferable to determine the specified timing after outputting an interrupt signal to the instruction execution unit so that the timing corresponds to a time point to output the interrupt signal.

Other Embodiments

In the above-mentioned embodiments, the context save process at Step S320 in FIG. 10 and the context restoration process at Step S550 in FIG. 12 perform read and write processes to move data between the registers of the CPU 15 and the RAM 16. However, the present invention need not be always limited thereto.

For example, a conventional microcomputer has a plurality of CPU register sets to save or restore contexts when an interrupt signal occurs. To save contexts when an interrupt occurs, the microcomputer changes the current register set to be used to another. To restore contexts, the microcomputer resumes the original register set to be used.

It may be preferable to use such microcomputer having a plurality of register sets as the microcomputer 12 according to the above-mentioned embodiments. At Step S320 above, the currently used register set can be changed to another unused register set. At Step S570, the currently used register set can be changed to the one most recently used. In this manner, it is possible to eliminate the need for the process to move data between the RAM 16 and the registers when saving and restoring contexts.

It will be obvious to those skilled in the art that various changes may be made in the above-described embodiments of the present invention. However, the scope of the present invention should be determined by the following claims.

What is claimed is:

1. A machine readable storage medium tangibly storing an interrupt request program, which upon execution by an instruction execution unit, causes the instruction execution unit to function as interrupt request means based on reception of a request to execute a task level process,
    wherein the instruction execution unit executes a process corresponding to an interrupt signal from a multi-interrupt unit for specifying and outputting a most highly prioritized one of a plurality of interrupt signals requested for output, and
    wherein the interrupt request means requests the multi-interrupt unit to output an interrupt signal corresponding to the task level process;
    wherein the interrupt request means assigns a plurality of types of task level processes to the same interrupt signal;
    wherein the execution of the interrupt request program by the instruction execution unit causes the instruction execution unit to function as interrupt associated means for executing a process corresponding to an interrupt signal from the multi-interrupt unit,
    wherein the interrupt request means causes the or another machine readable storage medium to store execution wait task information about correspondence between the task level process and its priority based on reception of a request for task level process execution and requests to output an interrupt signal corresponding to the task level process' priority, and
    wherein the interrupt associated means executes an earliest stored one of task level processes corresponding to a priority of an interrupt signal from the multi-interrupt unit based on execution wait task information stored in the or another machine readable storage medium.

2. A machine readable storage medium tangibly storing an interrupt request program, which upon execution by an instruction execution unit, causes the instruction execution unit to function as interrupt request means based on reception of a request to execute a task level process, wherein the instruction execution unit executes a process corresponding to an interrupt signal from a multi-interrupt unit for specifying and outputting a most highly prioritized one of a plurality of interrupt signals requested for output, and wherein the interrupt request means requests the multi-interrupt unit to output an interrupt signal corresponding to the task level process;

wherein the interrupt request means assigns a plurality of types of task level processes to the same interrupt signal;

wherein the execution of the interrupt request program by the instruction execution unit causes the instruction execution unit to function as termination process means upon completion of task level process execution by the instruction execution unit, wherein, when the or another machine readable storage medium stores a task level process having the same priority as the completed task level process as execution wait task information, the termination process means successively executes one of the stored task level processes; otherwise the termination process means provides process completion notification to the multi-interrupt unit, wherein the multi-interrupt unit specifies and outputs the most highly prioritized one of a plurality of interrupt signals requested for output based on reception of the process completion notification from the instruction execution unit.

3. A machine readable storage medium tangibly storing an interrupt request program, which upon execution by an instruction execution unit, causes the instruction execution unit to function as interrupt request means based on reception of a request to execute a task level process, wherein the instruction execution unit executes a process corresponding to an interrupt signal from a multi-interrupt unit for specifying and outputting a most highly prioritized one of a plurality of interrupt signals requested for output, and wherein the interrupt request means requests the multi-interrupt unit to output an interrupt signal corresponding to the task level process;

wherein the interrupt request means assigns one type of task level process to one interrupt signal, and wherein the multi-interrupt unit:

has a counting storage medium to store counting data for each interrupt signal, receives a request to output an interrupt signal corresponding to a given type of task level process, increments by one grade a counting data value for the interrupt signal, outputs a given interrupt signal to an instruction execution unit, and decrements by one grade a counting data value for the interrupt signal at a specified timing after the output.

4. A control unit comprising:

a multi-interrupt unit configured:

(i) to receive a request for an output of an interrupt signal when an interrupt occurs, the interrupt signal being with respect to at least an interrupt level process, and (ii) to specify and output a most highly prioritized one of a plurality of interrupt signals requested for output; and an instruction execution unit configured:

(i) to execute a process corresponding to an interrupt signal outputted from the multi-interrupt unit and (ii) to include interrupt request means for making a request, which requests the multi-interrupt unit to output an interrupt signal corresponding to a task level process, to the multi-interrupt unit based on reception of a request to execute the task level process, wherein the multi-interrupt unit thereby receives a request for an output of an interrupt signal further with respect to the task level process.

5. The control unit according to claim 4, wherein the interrupt request means assigns a plurality of types of task level processes to the same interrupt signal.

6. The control unit according to claim 5, wherein:

the instruction execution unit further includes interrupt associated means for executing a process corresponding to the interrupt signal from the multi-interrupt unit;

the interrupt request means causes a storage medium to store execution wait task information about correspondence between the task level process and its priority based on reception of a request for task level process execution and requests to output an interrupt signal corresponding to the task level process' priority; and the interrupt associated means executes an earliest stored one of task level processes corresponding to a priority of an interrupt signal from the multi-interrupt unit based on the execution wait task information stored in the storage medium.

7. The control unit according to claim 5, wherein:

the instruction execution unit further includes termination process means upon completion of task level process execution by the instruction execution unit, wherein, when a storage medium stores a task level process having the same priority as the completed task level process as execution wait task information, the termination process means successively executes one of the stored task level processes; and otherwise the termination process means provides process completion notification to the multi-interrupt unit; and the multi-interrupt unit specifies and outputs the most highly prioritized one of a plurality of interrupt signals requested for output based on reception of the process completion notification from the instruction execution unit.

8. The control unit according to claim 4, wherein:

the instruction execution unit further includes termination process means for providing the multi-interrupt unit with process completion notification when the instruction execution unit terminates execution of a task level process; and the multi-interrupt unit specifies and outputs the most highly prioritized one of a plurality of interrupt signals requested for output based on reception of the process completion notification from the instruction execution unit.

9. The control unit according to claim 4, wherein:

the multi-interrupt unit has a current priority storage medium to store a priority of a most recently output interrupt signal, specifies the most highly prioritized one of a plurality of interrupt signals requested for output, and outputs the specified interrupt signal when its priority is higher than the priority stored in the current priority storage medium; and the instruction execution unit further includes current priority rewrite means for rewriting the priority stored in the current priority storage medium of the multi-interrupt unit to a higher priority in order to artificially increase a priority of a currently executing task level process.

10. The control unit according to claim 4,
wherein the multi-interrupt unit:
   has a current priority storage medium to store a priority of a most recently output interrupt signal,
   has an interrupt priority storage medium for storing information about correspondence between an interrupt signal and its priority,
   specifies the most highly prioritized one of a plurality of interrupt signals requested for output, and
   outputs the specified interrupt signal when its priority is higher than the priority stored in the current priority storage medium;
wherein the instruction execution unit further includes interrupt priority rewrite means in order to artificially increase a priority of a currently executing task level process to a specified priority; and
wherein the interrupt priority rewrite means rewrites given information having a priority higher than or equal to the specified priority to a priority lower than or equal to the priority of the currently executing task level process, wherein the given information is stored in the interrupt priority storage medium of the multi-interrupt unit.

11. The control unit according to claim 4, wherein:
the interrupt request means assigns one type of task level process to one interrupt signal, and
the multi-interrupt unit:
   has a counting storage medium to store counting data for each interrupt signal,
   receives a request to output an interrupt signal corresponding to a given type of task level process,
   increments by one grade a counting data value for the interrupt signal,
   outputs a given interrupt signal to an instruction execution unit, and
   decrements by one grade a counting data value for the interrupt signal at a specified timing after the output.

12. The control unit according to claim 4, wherein:
a program of the task level process is executed after the program is called from another program using an interface to accept a request to execute the task level process;
a program of the interrupt level process is executed without using the interface; and
the interrupt request means makes a request, which requests the multi-interrupt unit to output an interrupt signal corresponding to the task level process, to the multi-interrupt unit when the interface accepts a request to execute the task level process.

13. The control unit according to claim 12, wherein:
the multi-interrupt unit receives a request of an output of an interrupt signal with respect to the interrupt level process when an interrupt occurs from other than the instruction execution unit, via an external input/output circuit.

14. A method for executing an interrupt request in a control unit including a multi-interrupt unit and an instruction execution unit, the method comprising:
   making an interrupt request, in an interrupt request portion of the instruction execution unit, to request the multi-interrupt unit to output an interrupt signal corresponding to a task level process;
   receiving, in the multi-interrupt unit, a request for an output of an interrupt signal with respect to (i) the task level process requested from the interrupt request portion of the instruction execution unit and (ii) an interrupt level process requested from other than the interrupt request portion of the instruction execution unit;
   specifying and outputting, in the multi-interrupt unit, a most highly prioritized one of a plurality of interrupt signals requested for output; and
   executing, in the instruction execution unit, a process corresponding to an interrupt signal outputted from the multi-interrupt unit.

15. The method according to claim 14, wherein the interrupt request portion assigns a plurality of types of task level processes to the same interrupt signal.

16. The method according to claim 15, wherein:
an interrupt associated portion of the instruction execution unit executes a process corresponding to an interrupt signal from the multi-interrupt unit;
the interrupt request portion causes a storage medium to store execution wait task information about correspondence between the task level process and its priority based on reception of a request for task level process execution and requests to output an interrupt signal corresponding to the task level process' priority; and
the interrupt associated portion executes an earliest stored one of task level processes corresponding to a priority of an interrupt signal from the multi-interrupt unit based on the execution wait task information stored in the storage medium.

17. The method according to claim 15, wherein:
a termination process portion is executed upon completion of task level process execution by the instruction execution unit, wherein, when a storage medium stores a task level process having the same priority as the completed task level process as execution wait task information, the termination process portion successively executes one of the stored task level processes, and otherwise the termination process portion provides process completion notification to the multi-interrupt unit;
the multi-interrupt unit specifies and outputs the most highly prioritized one of a plurality of interrupt signals requested for output based on reception of the process completion notification from the instruction execution unit.

18. The method according to claim 14, wherein:
a termination process portion of the instruction execution unit provides the multi-interrupt unit with process completion notification when the instruction execution unit terminates execution of a task level process; and
the multi-interrupt unit specifies and outputs the most highly prioritized one of a plurality of interrupt signals requested for output based on reception of the process completion notification from the instruction execution unit.

19. The method according to claim 14, wherein:
current priority storage medium of the multi-interrupt unit stores a priority of a most recently output interrupt signal,
the multi-interrupt unit specifies the most highly prioritized one of a plurality of interrupt signals requested for output, and outputs the specified interrupt signal when its priority is higher than the priority stored in the current priority storage medium, and
a current priority rewrite portion of the instruction execution unit rewrites the priority stored in the current priority storage medium of the multi-interrupt unit to a higher priority in order to artificially increase a priority of a currently executing task level process.

20. The method according to claim 14, wherein the multi-interrupt unit:
   has a current priority storage medium to store a priority of a most recently output interrupt signal,
   has an interrupt priority storage medium for storing information about correspondence between an interrupt signal and its priority,
   specifies the most highly prioritized one of a plurality of interrupt signals requested for output, and
   outputs the specified interrupt signal when its priority is higher than the priority stored in the current priority storage medium;
   an interrupt priority rewrite portion of the instruction execution unit artificially increases a priority of a currently executing task level process to a specified priority; and
   the interrupt priority rewrite portion rewrites given information having a priority higher than or equal to the specified priority to a priority lower than or equal to the priority of the currently executing task level process, wherein the given information is stored in the interrupt priority storage medium of the multi-interrupt unit.

21. The method according to claim 14,
   wherein the interrupt request portion assigns one type of task level process to one interrupt signal, and
   wherein the multi-interrupt unit:
   has a counting storage medium to store counting data for each interrupt signal,
   receives a request to output an interrupt signal corresponding to a given type of task level process,
   increments by one grade a counting data value for the interrupt signal,
   outputs a given interrupt signal to an instruction execution unit, and
   decrements by one grade a counting data value for the interrupt signal at a specified timing after the output.

22. The method according to claim 14, wherein:
   a program of the task level process is executed after the program is called from another program using an interface to accept a request to execute the task level process;
   a program of the interrupt level process is executed without using the interface; and
   the interrupt request portion makes a request, which requests the multi-interrupt unit to output an interrupt signal corresponding to the task level process, to the multi-interrupt unit when the interface accepts a request to execute the task level process.

23. The method according to claim 22, wherein
   the multi-interrupt unit receives a request of an output of an interrupt signal with respect to the interrupt level process when an interrupt occurs from other than the instruction execution unit, via an external input/output circuit.

* * * * *